(12) United States Patent
Fuchii et al.

(10) Patent No.: US 12,358,196 B2
(45) Date of Patent: Jul. 15, 2025

(54) MATERIAL DISCHARGE DEVICE, NOZZLE, AND PLASTICIZING DEVICE

(71) Applicant: SEIKO EPSON CORPORATION, Tokyo (JP)

(72) Inventors: Masashi Fuchii, Minowa (JP); Takayuki Sasaki, Matsumoto (JP); Kenta Anegawa, Matsumoto (JP); Masayuki Takahashi, Matsumoto (JP); Hidenobu Maruyama, Azumino (JP); Juri Yamaguchi, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 183 days.

(21) Appl. No.: 18/456,830

(22) Filed: Aug. 28, 2023

(65) Prior Publication Data

US 2024/0066776 A1    Feb. 29, 2024

(30) Foreign Application Priority Data

Aug. 29, 2022 (JP) ................................. 2022-135663

(51) Int. Cl.
*B29C 45/20* (2006.01)
*B29C 45/47* (2006.01)
(Continued)

(52) U.S. Cl.
CPC .............. *B29C 45/60* (2013.01); *B29C 45/20* (2013.01); *B29C 45/47* (2013.01); *B29C 45/74* (2013.01); *B29C 45/77* (2013.01); *B29C 45/78* (2013.01); *B29C 2945/76006* (2013.01); *B29C 2945/7604* (2013.01); *B29C 2945/76187* (2013.01);
(Continued)

(58) Field of Classification Search
CPC .............. B29C 45/20; B29C 2045/202; B29C 2045/205; B29C 2045/207; B29C 64/205; B29C 64/209
See application file for complete search history.

(56) References Cited

U.S. PATENT DOCUMENTS 6,638,053 B2 * 10/2003 Gellert ................ B29C 45/2737
425/549
2020/0406531 A1    12/2020 Hashimoto et al.

FOREIGN PATENT DOCUMENTS

JP      H0577306 A  *  3/1993  ........... B29C 48/345
JP      2021-006375 A     1/2021

* cited by examiner

*Primary Examiner* — Thu Khanh T. Nguyen
(74) *Attorney, Agent, or Firm* — Harness, Dickey & Pierce, P.L.C.

(57) ABSTRACT

A material discharge device includes: a drive motor; a screw having a groove formation surface and configured to rotate; a barrel having a facing surface and formed with a communication hole through which a plasticized material flows; a heating unit configured to heat the material; a nozzle from which the material is injected to an outside; and a plurality of measurement units configured to measure a pressure or a temperature of the material. The measurement units are disposed at an outer periphery of a nozzle channel wall, and a thickness of the nozzle channel wall satisfies the following (1) or (2): (1) when the nozzle channel wall is made of a material containing iron as a main component, the thickness of the nozzle channel wall is 0.2 mm or more and 2.5 mm or less; and (2) when the nozzle channel wall is made of a material containing aluminum as a main component, the thickness of the nozzle channel wall is 0.2 mm or more and 4 mm or less.

12 Claims, 17 Drawing Sheets

(51) Int. Cl.
  *B29C 45/60* (2006.01)
  *B29C 45/74* (2006.01)
  *B29C 45/77* (2006.01)
  *B29C 45/78* (2006.01)
(52) U.S. Cl.
  CPC ................ *B29C 2945/7619* (2013.01); *B29C 2945/7621* (2013.01)

FIG. 14

| MATERIAL | YOUNG'S MODULUS | MAXIMUM THICKNESS (mm) | | | | |
|---|---|---|---|---|---|---|
| | | NOZZLE | SCREW | BARREL | CHECK VALVE PRESSING PORTION | INJECTION CYLINDER |
| SUPER HARD MATERIAL | 600 | 2.0 | 7.0 | 10.0 | 8.0 | 4.0 |
| STAINLESS STEEL | 202 | 2.5 | 10.0 | 15.0 | 11.0 | 5.5 |
| ALUMINUM | 70 | 4.0 | 14.0 | 21.0 | 16.0 | 8.0 |
| RESIN | 4 | 9.0 | 37.0 | 55.0 | 41.0 | 20.0 |

MATERIAL DISCHARGE DEVICE, NOZZLE, AND PLASTICIZING DEVICE

The present application is based on, and claims priority from JP Application Serial Number 2022-135663, filed Aug. 29, 2022, the disclosure of which is hereby incorporated by reference herein in its entirety.

BACKGROUND

1. Technical Field

The present disclosure relates to a material discharge device, a nozzle, and a plasticizing device.

2. Related Art

For example, JP-A-2021-6375 discloses a three-dimensional shaping device including a pressure measurement unit configured to measure a pressure of a shaping material in a channel of a plasticizing unit, and a control unit configured to adjust rotation of a screw according to a measurement value of the measured pressure. Specifically, the plasticizing unit includes a flat screw having a groove formation surface formed with a groove to which the material is supplied, and a barrel having a facing surface facing the groove formation surface and having an opening of the channel provided in the facing surface. The pressure measurement unit is provided in a first channel that is close to the opening.

In the three-dimensional shaping device in JP-A-2021-6375, the amount of the shaping material discharged from the nozzle is stabilized by adjusting the rotation of the screw according to the measurement value of the pressure obtained by the pressure measurement unit.

However, there is room for improvement in the three-dimensional shaping device in JP-A-2021-6375. Specifically, since the pressure measurement unit in JP-A-2021-6375 measures the pressure at one point in the channel, it is difficult to analyze a state of the shaping material in the channel in detail. Therefore, there is room for improvement in performing more accurate feedback control.

SUMMARY

A material discharge device according to an aspect of the present application includes: a drive motor; a screw having a groove formation surface formed with a groove, and configured to rotate about a drive shaft of the drive motor; a barrel having a facing surface facing the groove formation surface, and formed with a communication hole through which a plasticized material flows; a heating unit configure to heat the material supplied to the groove; a nozzle that communicates with the communication hole and from which the plasticized material is injected to an outside; and a plurality of measurement units configured to measure a pressure or a temperature of the material at a plurality of locations in a channel through which the material passes. The measurement unit is disposed at an outer periphery of a nozzle channel wall that defines the channel in the nozzle, and a thickness of the nozzle channel wall satisfies the following (1) or (2):
(1) when the nozzle channel wall is made of a material containing iron as a main component, the thickness of the nozzle channel wall is 0.2 mm or more and 2.5 mm or less, and
(2) when the nozzle channel wall is made of a material containing aluminum as a main component, the thickness of the nozzle channel wall is 0.2 mm or more and 4 mm or less.

An injection molding device according to an aspect of the present application includes the above-described material discharge device, and a fixing portion that fixes a mold. The mold receives the material injected from the nozzle.

A nozzle according to an aspect of the present application is a nozzle for injecting a plasticized material. The nozzle includes a nozzle channel wall that defines a channel through which the material flows. A plurality of measurement units configured to measure a pressure or a temperature of the material at a plurality of locations in the channel are provided at an outer periphery of the nozzle channel wall, and a thickness of the nozzle channel wall satisfies the following (1) or (2):
(1) when the nozzle channel wall is made of a material containing iron as a main component, the thickness of the nozzle channel wall is 0.2 mm or more and 2.5 mm or less; and
(2) when the nozzle channel wall is made of a material containing aluminum as a main component, the thickness of the nozzle channel wall is 0.2 mm or more and 4 mm or less.

A plasticizing device according to an aspect of the present application includes: a drive motor; a screw having a groove formation surface formed with a groove, and configured to rotate about a drive shaft of the drive motor; a barrel having a facing surface facing the groove formation surface, and formed with a communication hole through which a plasticized material flows; a heating unit configured to heat the material supplied to the groove; and a plurality of measurement units configured to measure a pressure or a temperature of the material on the facing surface. The barrel includes a third portion having the facing surface, and a fourth portion that is separate from the third portion and that does not have the facing surface. The measurement unit is disposed between the third portion and the fourth portion. A thickness of the third portion satisfies the following (1) or (2):
(1) when the third portion is made of a material containing iron as a main component, the thickness of the third portion is 0.2 mm or more and 15 mm or less; and
(2) when the third portion is made of a material containing aluminum as a main component, the thickness of the third portion is 0.2 mm or more and 21 mm or less.

BRIEF DESCRIPTION OF THE DRAWINGS

FIG. 14 is a table illustrating a simulation result of a pressure sensor installation position.

DESCRIPTION OF EMBODIMENTS

First Embodiment

Overview of Injection Molding Device

Figure 1:
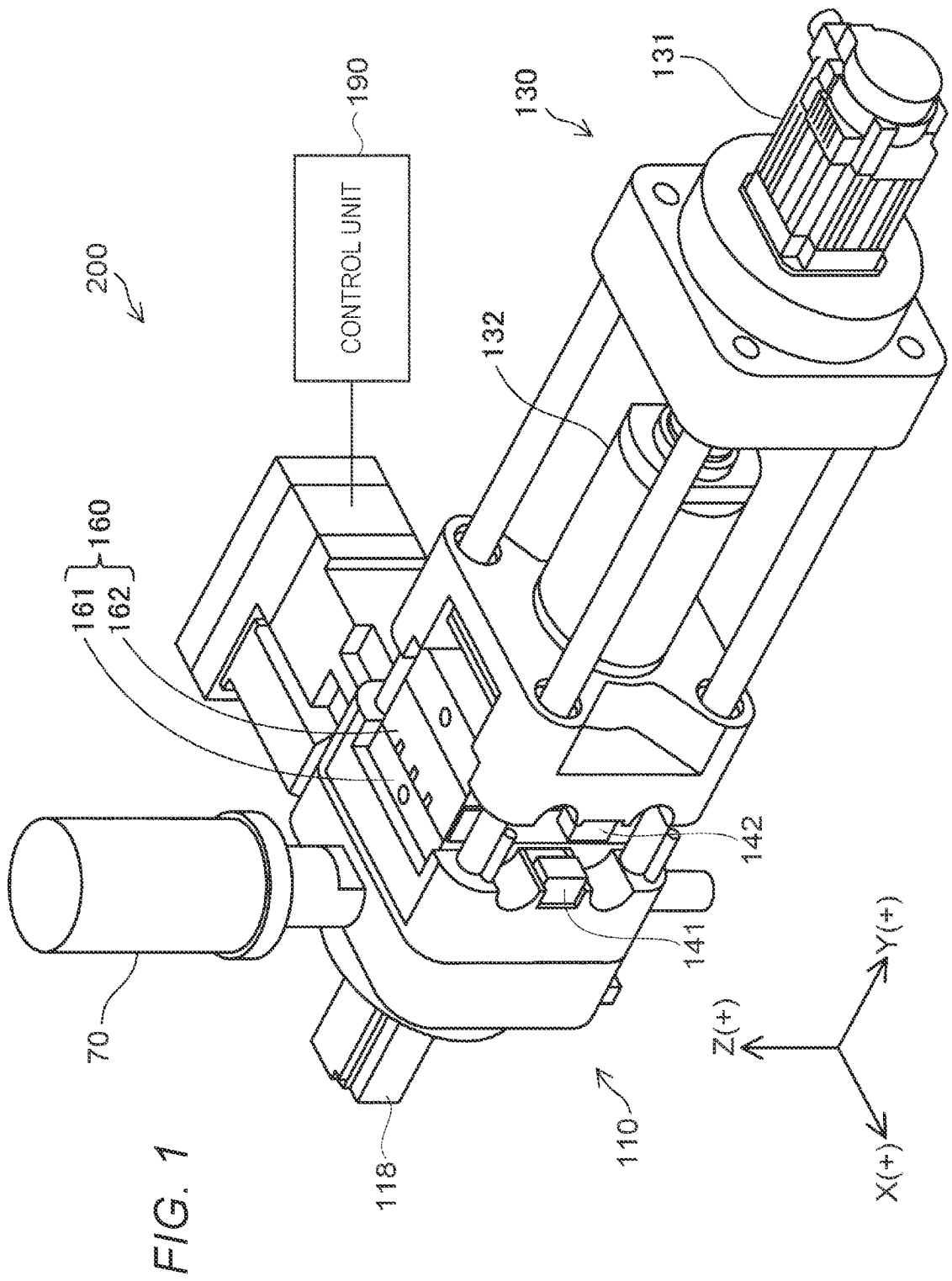
FIG. 1 is a perspective view of an injection molding device according to a first embodiment.

FIG. 1 is a perspective view illustrating a schematic configuration of an injection molding device according to a first embodiment.

As illustrated in FIG. 1, an injection molding device 200 according to the embodiment includes a material discharge device 110, a mold clamping device 130, a mold 160, a control unit 190, and the like. In the drawings, an X axis, a Y axis, and a Z axis, which are three axes orthogonal to one another, are illustrated. Specifically, an extending direction of the mold clamping device 130 is defined as a +Y direction, and an extending direction of a hopper 70 of the material discharge device 110 is defined as a +Z direction.

The injection molding device 200 injects a molding material from the material discharge device 110 into the mold 160 to mold a molded product.

Operations of the material discharge device 110 and the mold clamping device 130 are controlled by the control unit 190. The control unit 190 is implemented as a computer including a CPU and a memory, and controls each unit of the injection molding device 200 by the CPU executing a program stored in the memory. The control unit 190 may be implemented by a circuit. Power is supplied from a power supply unit to each unit of the injection molding device 200, and illustration thereof is omitted.

In the embodiment, the mold 160 made of metal is mounted on the mold clamping device 130. A material of the mold 160 is not limited to a metal, and may be a resin or ceramic. The mold 160 made of metal is referred to as a mold. The mold 160 includes a fixed mold 161 and a movable mold 162. The fixed mold 161 is fixed to the material discharge device 110, and the movable mold 162 is fixed to the mold clamping device 130.

The mold clamping device 130 can move the movable mold 162 in a mold clamping direction and a mold opening direction with respect to the fixed mold 161. In the embodiment, the mold clamping direction and the mold opening direction are a −Y direction and the +Y direction, respectively.

A fixed-mold support portion 141 is provided on a +Y side of the material discharge device 110. The fixed-mold support portion 141 includes a clamp mechanism for fixing the fixed mold 161. Another fixed-mold support portion 141 is provided at a surface on an opposite side (−X direction) from the fixed mold 161, forming a pair.

A movable-mold support portion 142 is provided on a −Y side of the mold clamping device 130. The movable-mold support portion 142 includes a clamp mechanism for fixing the movable mold 162. Another movable-mold support portion 142 is provided at a surface on an opposite side (+X direction) from the movable mold 162, forming a pair. The fixed-mold support portion 141 and the movable-mold support portion 142 correspond to fixing portions.

In other words, the injection molding device 200 includes the material discharge device 110, and the fixed-mold support portions 141 and the movable-mold support portions 142 serving as fixing portions that fix the mold 160. The mold 160 receives the material injected from the material discharge device 110.

The mold clamping device 130 has a function of opening and closing the fixed mold 161 and the movable mold 162. Under control of the control unit 190, the mold clamping device 130 drives a mold drive unit 131 implemented by a motor to rotate a ball screw 132, and causes the movable mold 162 joined to the ball screw 132 to move with respect to the fixed mold 161, thereby opening and closing the mold 160.

The hopper 70 into which the material of the molded product is put is coupled to the material discharge device 110. As the material of the molded product, for example, a thermoplastic resin formed in a pellet shape is used. Examples of the thermoplastic resin include acrylonitrile butadiene styrene (ABS), polycarbonate (PC), polyacetal (POM), polypropylene (PP), and polybutylene terephthalate (PBT). The supply of the material to the material discharge device 110 is not limited to being performed via the hopper 70, and may be performed via, for example, a tube in which the material is pressure-fed.

The material discharge device 110 plasticizes at least a part of the material supplied from the hopper 70 to generate a molding material, and injects the molding material into a cavity defined between the fixed mold 161 and the movable mold 162. The molding material is also referred to as a plasticized material. "Plasticization" is a concept including melting, and refers to changing from a solid state to a state of presenting fluidity. Specifically, in a case of a material in which glass transition occurs, the plasticization refers to setting a temperature of the material to be equal to or higher than a glass transition point. In a case of a material in which the glass transition does not occur, the plasticization refers to setting a temperature of the material to be equal to or higher than a melting point thereof.

Overview of Material Discharge Device

Figure 2:
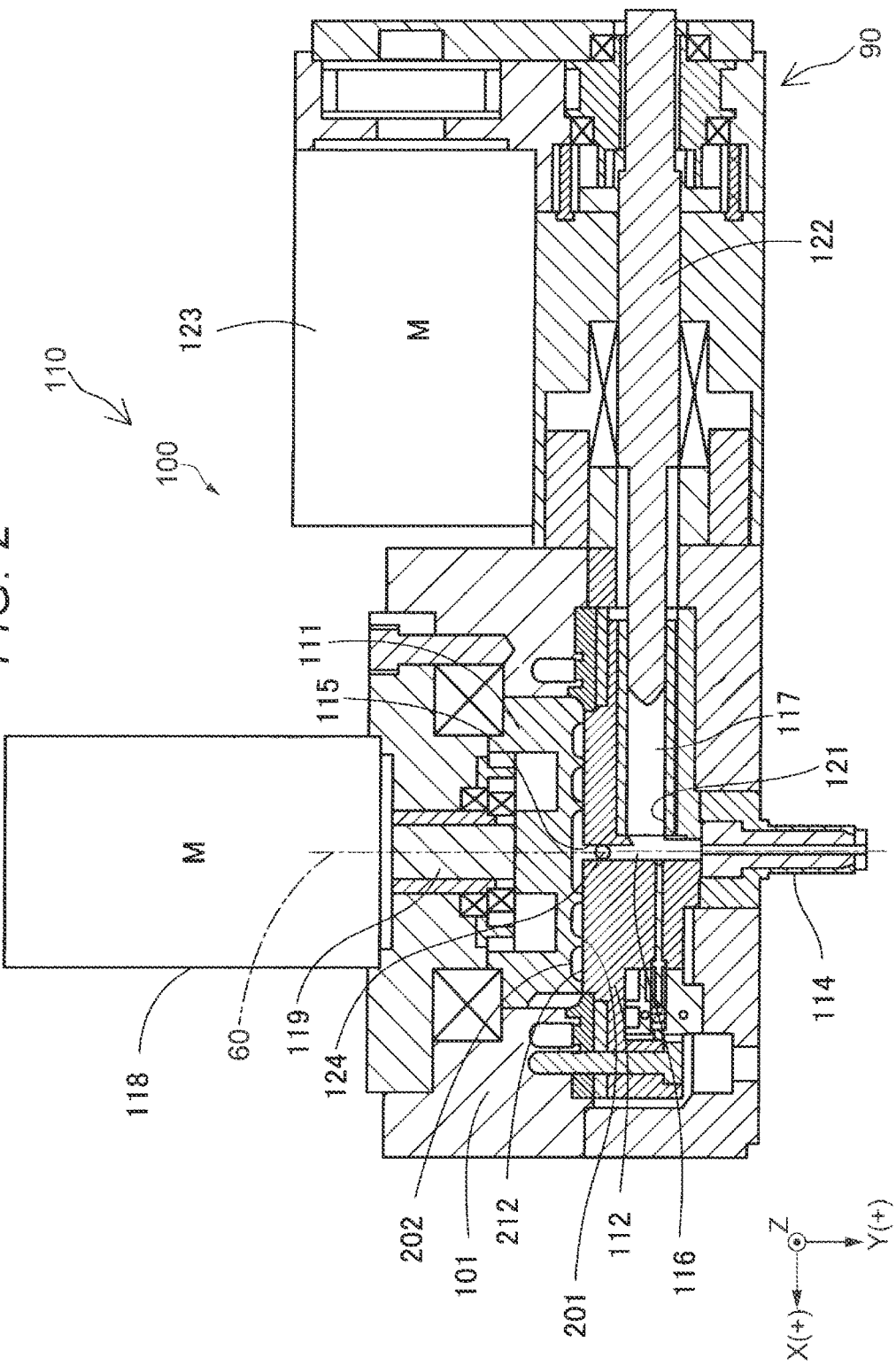
FIG. 2 is a cross-sectional view illustrating a schematic configuration of a material discharge device.

FIG. 2 is a cross-sectional view illustrating a schematic configuration of the material discharge device.

The material discharge device 110 includes a screw 111, a barrel 112, a suction and delivery portion 90, and a nozzle 114. A device configuration obtained by removing the nozzle 114 from the configuration of the material discharge device 110 is referred to as a plasticizing device 100.

The screw 111 is accommodated in an accommodating portion 101. The screw 111 is also called a rotor or a flat screw. The screw 111 is rotated by a drive motor 118, in the accommodating portion 101 around a drive shaft 119 of the drive motor 118. A line segment passing through a center of the drive shaft 119 and extending along the Y axis is defined as a center line 60. The center line 60 coincides with the center of the drive shaft 119 of the drive motor 118 in an XZ plane. The rotation of the screw 111 by the drive motor 118 is controlled by the control unit 190. The screw 111 may be driven by the drive motor 118 via a speed reducer.

A communication hole 115 is formed at a center of the barrel 112. The communication hole 115 communicates with a channel 116. A cylinder 121 and the nozzle 114, which will be described later, are coupled to the channel 116. In the embodiment, centers of the barrel 112, the communication hole 115, the channel 116, and the nozzle 114 coincide with the center line 60.

In the channel 116, a spherical check valve 124 is provided upstream of the cylinder 121. The check valve 124 prevents backflow of the plasticized material from a nozzle 114 side to a screw 111 side.

The suction and delivery portion 90 includes the cylinder 121, a plunger 122, a plunger drive unit 123, and the like.

The cylinder 121 includes, as a part of the channel 116, a branch channel 117 branched from the channel 116 in the −X direction. That is, an interior of the cylinder 121 is the branch channel 117. The suction and delivery portion 90 has a function of injecting the plasticized material in the cylinder 121 into the cavity of the mold 160. Under the control of the control unit 190, the suction and delivery portion 90 controls an injection amount, an injection speed, and an injection pressure of the molding material from the nozzle 114. The cylinder 121 has a substantially cylindrical shape, and includes the plunger 122 therein.

The plunger 122 suctions the plasticized material into the branch channel 117 by moving inside the cylinder 121 in a direction away from the channel 116 and measures the plasticized material. Then, the plunger 122 delivers the plasticized material to the channel 116 by moving inside the cylinder 121 in a direction approaching the channel 116.

The delivered plasticized material is pressure-fed to the nozzle 114. The plunger 122 is driven by the plunger drive unit 123 including a motor. The plasticized material pressure-fed to the nozzle 114 is injected from the nozzle 114 into the cavity of the mold 160. In other words, the material discharge device 110 includes the cylinder 121 including the branch channel 117 branched from the communication hole 115, and the suction and delivery portion 90 including the plunger 122 that reciprocates in the cylinder 121 to suction the plasticized material or deliver the suctioned material to the channel.

Figure 3:
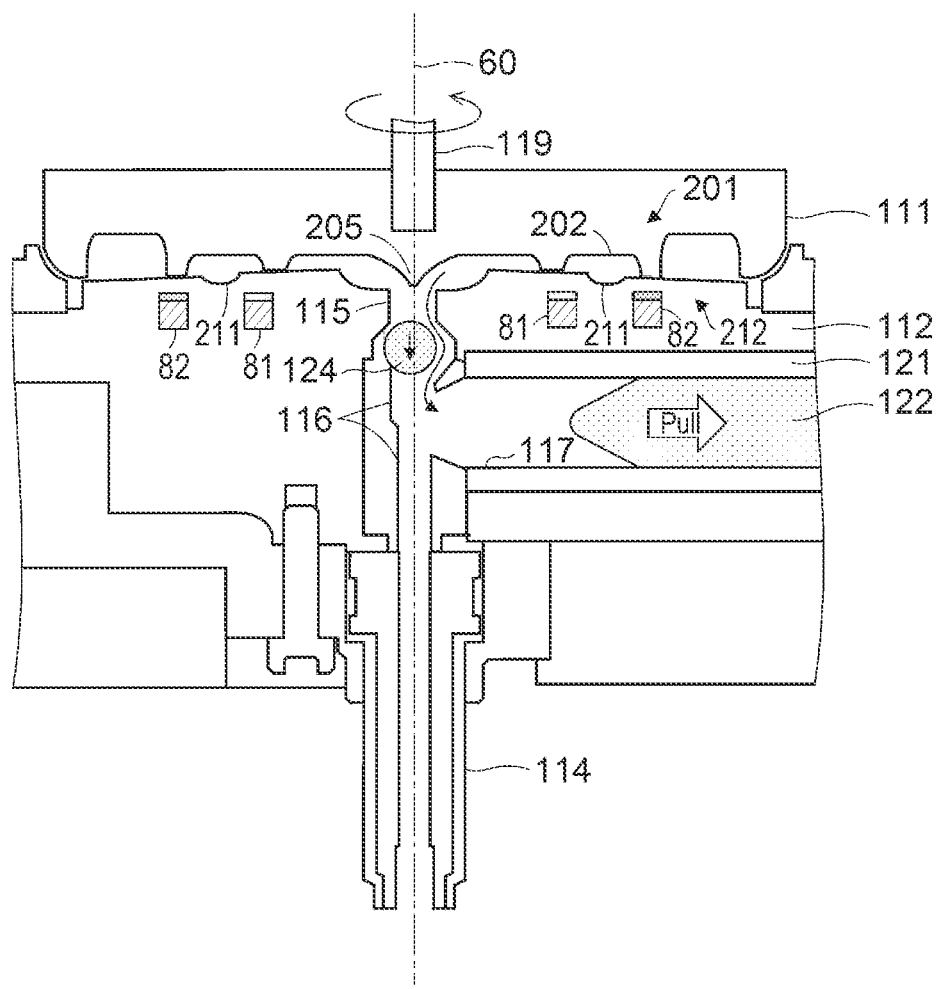
FIG. 3 is a cross-sectional view illustrating a mode during material suction.
Figure 4:
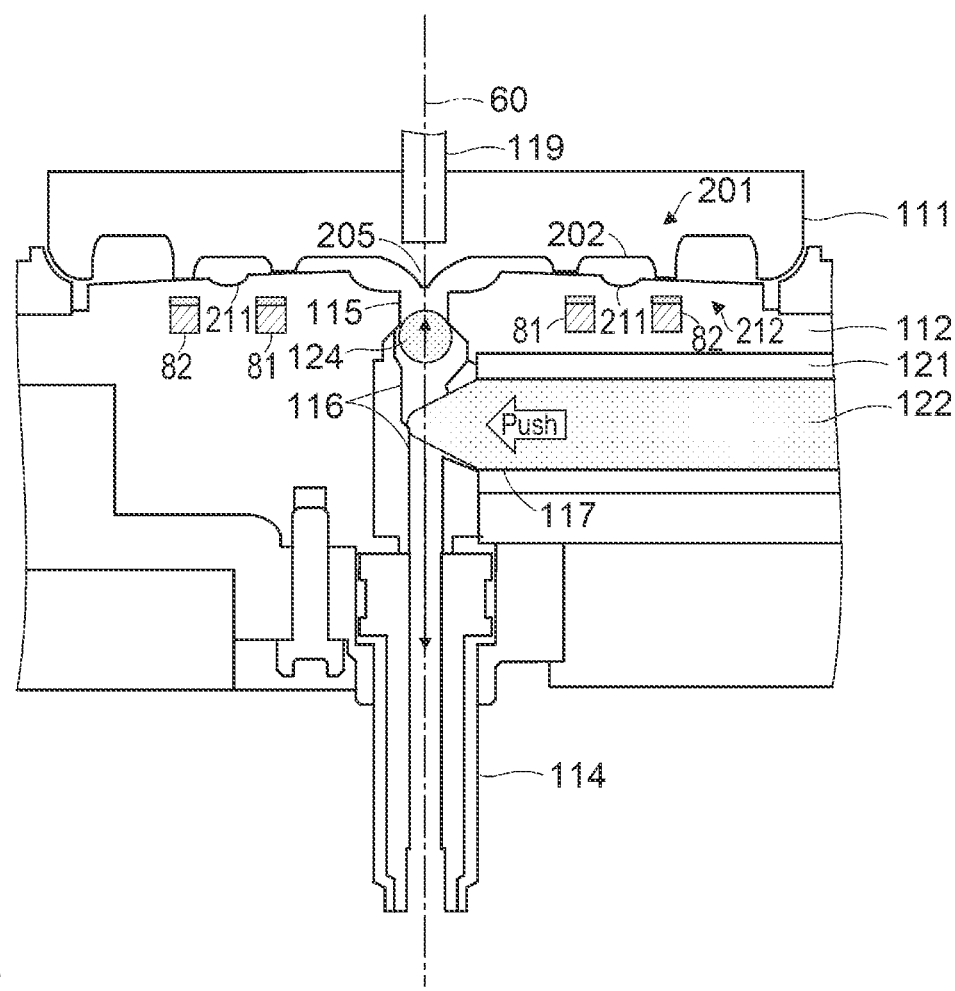
FIG. 4 is a cross-sectional view illustrating a mode during pressure feeding of material.
Figure 5:
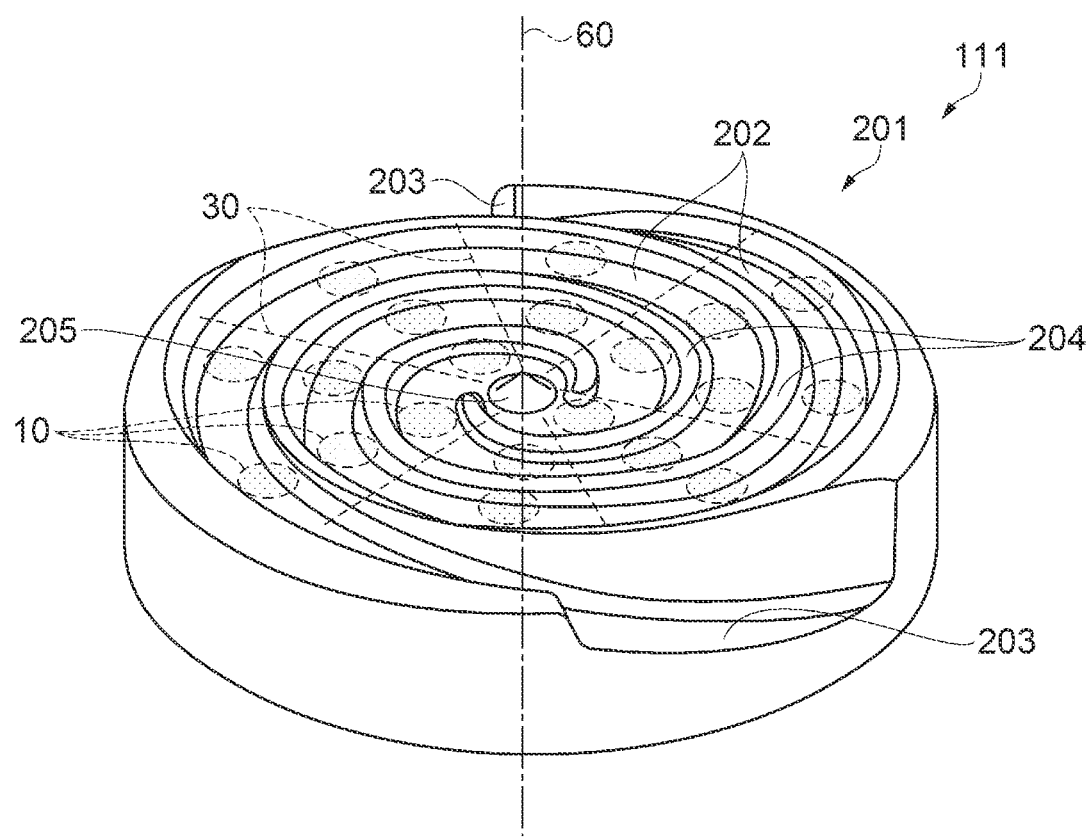
FIG. 5 is a perspective view of a screw.
Figure 10:
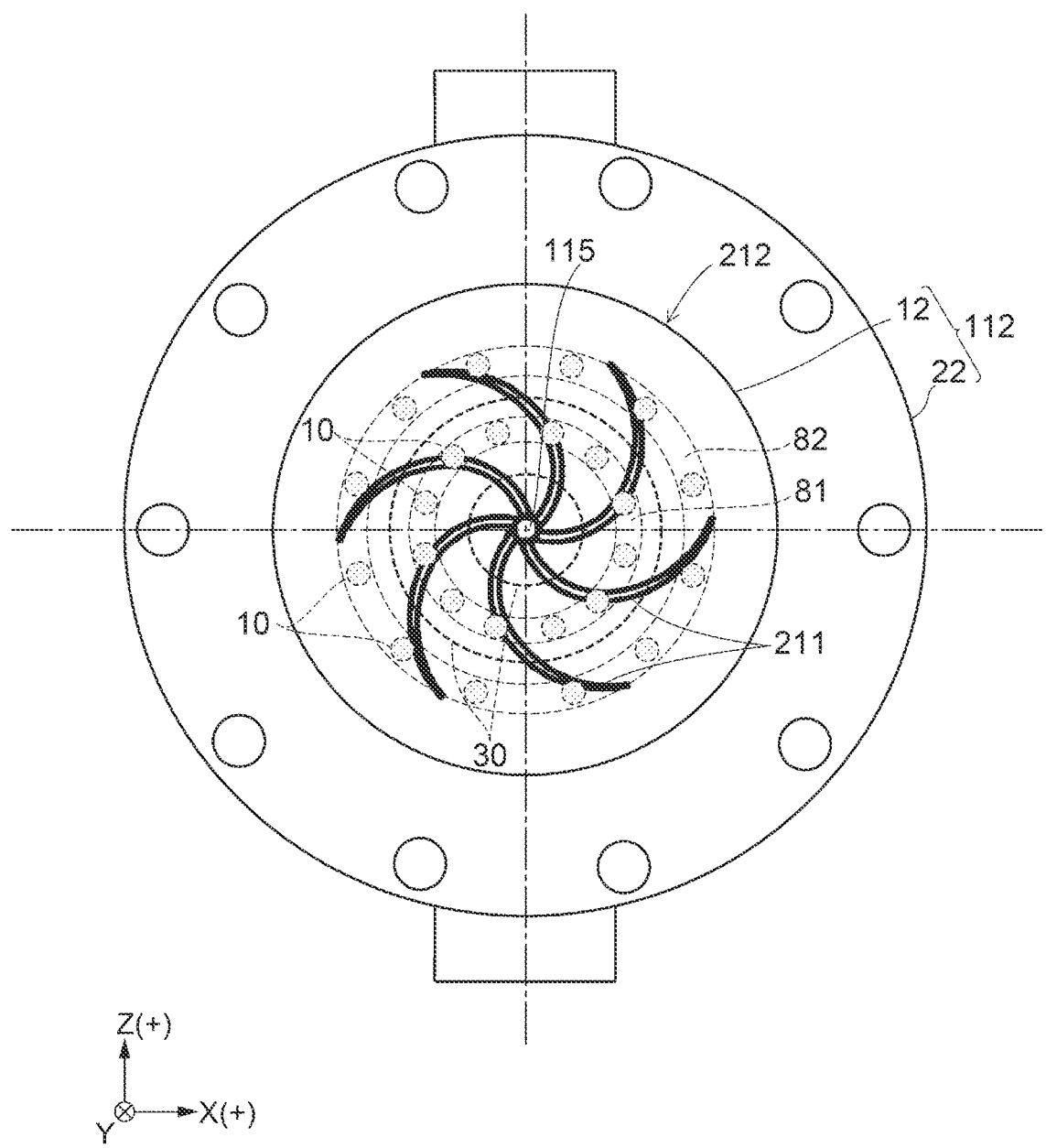
FIG. 10 is a plan view of a barrel.

FIG. 3 is a cross-sectional view illustrating a mode during material suction. FIG. 4 is a cross-sectional view illustrating a mode during pressure feeding of the material. FIG. 5 is a perspective view of the screw. FIG. 10 is a plan view of the barrel. As illustrated in FIG. 5, the screw 111 has a substantially cylindrical shape in which a height in a direction along the center line 60 is smaller than a diameter thereof. On a groove formation surface 201 of the screw 111, spiral grooves 202 are formed around a center portion 205. The groove formation surface 201 is a surface facing a facing surface 212 of the barrel 112. In other words, the screw 111 is a flat screw in which a length in a direction in which the drive shaft 119 (FIG. 3) extends is smaller than a length in a direction perpendicular to the direction in which the drive shaft 119 extends, and the groove formation surface 201 and the facing surface 212 face each other in the direction in which the drive shaft 119 extends.

The grooves 202 communicate with material inlets 203 formed at a side surface of the screw 111. The material supplied from the hopper 70 is supplied to the grooves 202 through the material inlets 203. The grooves 202 are formed by being separated by ridge portions 204. Although FIG. 5 illustrates an example in which two grooves 202 are formed, the number of grooves 202 may be one or three or more.

As illustrated in FIG. 10, the barrel 112 has the facing surface 212 facing the groove formation surface 201 of the screw 111. The communication hole 115 communicating with the channel 116 is formed at a center of the facing surface 212. A plurality of guide grooves 211 coupled to the communication hole 115 and extending in a spiral shape from the communication hole 115 toward an outer periphery are formed at the facing surface 212. The guide groove 211 has a function of guiding the plasticized material to the communication hole 115. The guide groove 211 may not be directly coupled to the communication hole 115, and the guide groove 211 may not be formed at the facing surface 212.

As illustrated in FIG. 3, heaters 81 and 82 are provided inside the facing surface 212 of the barrel 112. The heaters 81 and 82 are ring-shaped heating-wire heaters, and are concentrically arranged (FIG. 16) around the communication hole 115. The heaters 81 and 82 are separately controlled by the control unit 190. The heaters 81 and 82 may not be ring-shaped, and may be, for example, polygonal.

The material supplied to the groove 202 of the screw 111 flows between the screw 111 and the barrel 112 while being plasticized due to heating by the heaters 81 and 82 and rotation of the screw 111, and is guided to the center portion 205.

As illustrated in FIG. 3, at the time of suction when the plunger 122 moves in the −X direction, the check valve 124 moves in the +Y direction, and the plasticized material flows from the channel 116 into the branch channel 117 in the cylinder 121 as indicated by an arrow.

On the other hand, as illustrated in FIG. 4, at the time of pressure feeding when the plunger 122 moves in the +X direction, the communication hole 115 is closed by the movement of the check valve 124 in the −Y direction by the material pressure for pressure feeding, and the backflow of the plasticized material is prevented. The plasticized material extruded by the plunger 122 is pressure-fed to the nozzle 114 as indicated by an arrow.

In other words, the plasticizing device 100 includes the drive motor 118, the screw 111 that has the groove formation surface 201 formed with the groove 202 and that rotates around the drive shaft 119 of the drive motor 118, the barrel 112 that has the facing surface 212 facing the groove formation surface 201 and in which the communication hole 115 is formed, and the heaters 81 and 82 as heating units that heat the material supplied to the groove 202. The plasticized material flows through the communication hole 115. In addition to the configuration of the plasticizing device 100, the material discharge device 110 further includes the nozzle 114 that communicates with the communication hole 115 and through which the plasticized material is injected to the outside.

Arrangement Mode of Sensors in Screw

Figure 6:
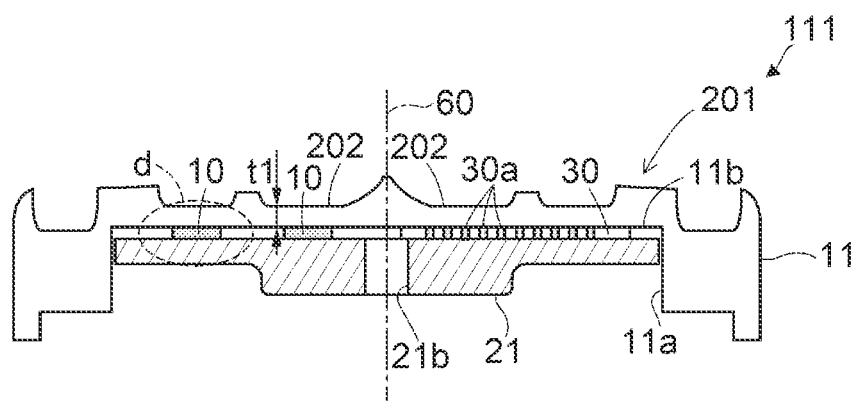
FIG. 6 is a cross-sectional view of the screw.

FIG. 6 is a cross-sectional view of the screw.

Here, an arrangement mode of pressure sensors 10 and temperature sensors 30 will be described with reference to FIGS. 5 and 6.

As illustrated in FIG. 5, as measurement units, a plurality of pressure sensors 10 and a plurality of temperature sensors 30 are disposed inside the groove formation surface 201 of the screw 111.

The plurality of pressure sensors 10 each have a small circular plate shape in a plan view, and are arranged radially from the center portion 205 at portions overlapping the grooves 202.

The plurality of temperature sensors 30 each have a rod shape in a plan view, and are arranged radially from the center portion 205. As illustrated in FIG. 5, the plurality of pressure sensors 10 and the plurality of temperature sensors 30 are arranged such that the plurality of pressure sensors 10 do not overlap the plurality of temperature sensors 30 in the plan view.

As illustrated in FIG. 6, the screw 111 includes two portions, that is, a first portion 11 and a second portion 21. In a preferred example, both the first portion 11 and the second portion 21 are made of stainless steel. The first portion 11 and the second portion 21 may be made of aluminum.

The first portion 11 has the groove formation surface 201, and a cavity 11a that is a recess for accommodating the second portion 21 is formed at a back surface of the first portion 11.

The second portion 21 is a circular plate-shaped member, and a through hole 21b into which the drive shaft 119 is inserted is formed in a center thereof. The first portion 11 and the second portion 21 are integrated by a coupling mechanism including a bolt (not illustrated), and rotate together with the rotation of the drive shaft 119.

The pressure sensors 10 and the temperature sensors 30 are disposed between the first portion 11 and the second portion 21.

A left side of the center line 60 in FIG. 6 shows a cross section of the pressure sensor 10. As illustrated in FIG. 6, the pressure sensor 10 is attached under a bottom surface of the groove 202. In a preferred example, the pressure sensor 10 is provided at a bottom surface 11b of the cavity 11a of the first portion 11.

Figure 7:
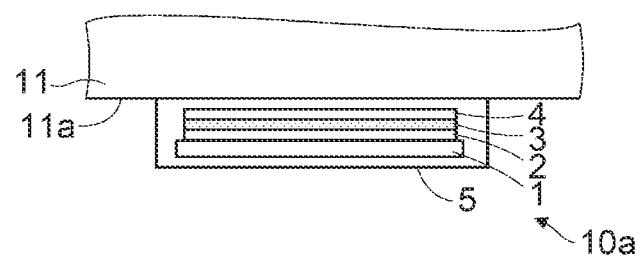
FIG. 7 is an enlarged view of a mode in a portion d in FIG. 6.
Figure 8:
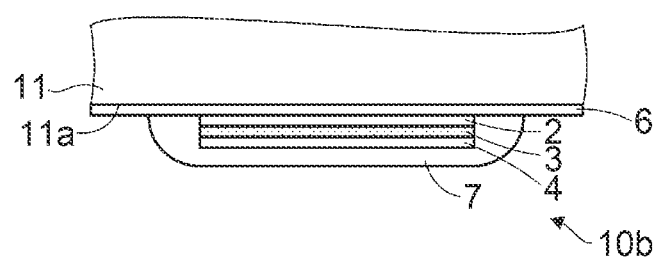
FIG. 8 is an enlarged view of a different mode in a portion d in FIG. 6.

FIGS. 7 and 8 are enlarged views of a portion d in FIG. 6.

In a preferred example, the pressure sensor 10 is a pressure sensor using a piezoelectric element. The pressure sensor 10 may be an individual discrete component or may be formed at the bottom surface 11b of the cavity 11a of the first portion 11.

A pressure sensor 10a illustrated in FIG. 7 illustrates an example of a case where the pressure sensor 10 is a discrete component.

The pressure sensor 10a has a configuration in which a first electrode 2, a piezoelectric element 3, and a second electrode 4 are laminated in this order on a substrate 1. The first electrode 2, the piezoelectric element 3, and the second electrode 4 constitute a piezoelectric body.

The substrate 1 is, for example, a ceramic substrate, on which the first electrode 2 serving as a metal electrode is deposited.

The piezoelectric element 3 is deposited on the first electrode 2, and for example, $Pb(Zr, Ti)O_3$ (PZT) or lithium niobate ($LiNbO_3$) is used. Then, the second electrode 4 that is a metal electrode is deposited on the piezoelectric element 3. That is, the piezoelectric element 3 is sandwiched between the first electrode 2 and the second electrode 4. The laminate is sealed with a metal package 5.

In a preferred example, the pressure sensor 10a is fixed to the bottom surface 11b of the cavity 11a with a heat-resistant adhesive. As the heat-resistant adhesive, for example, a heat-resistant inorganic adhesive, in which a fireproof ceramic such as alumina and an inorganic polymer serve as main components, or a cement adhesive is used.

A pressure sensor 10b illustrated in FIG. 8 illustrates an example of a case where the pressure sensor 10 is a deposition component formed by deposition.

First, an insulating layer 6 is provided at the bottom surface 11b of the cavity 11a of the first portion 11. In a preferred example, the insulating layer 6 is a ceramic film, and is deposited using, for example, a ceramic coating by plasma spraying. The insulating layer is not limited to the ceramic film, and may be any insulating layer having insulating properties and heat resistance.

The pressure sensor 10b has a configuration in which the first electrode 2, the piezoelectric element 3, and the second electrode 4 are laminated in this order on the insulating layer 6 on the bottom surface 11b. Materials of the first electrode 2, the piezoelectric element 3, and the second electrode 4 are the same as those of the pressure sensor 10a. As a deposition method, a chemical vapor deposition (CVD) method, an evaporation method, sputtering, or the like can be used. The laminate is sealed with an insulating layer 7. In a preferred example, the insulating layer 7 is a ceramic film.

In a preferred example, the pressure sensor 10b may be formed by deposition in at least one of the nozzle 114, the screw 111, the barrel 112, and the cylinder 121.

In the following description, in a case where the pressure sensors 10a and 10b are not distinguished from each other and either can be selected, the pressure sensor 10 will be described without being assigned a branch number.

In other words, the screw 111 includes the first portion 11 having the groove formation surface 201 and the second portion 21 that is separate from the first portion 11 and that is coupled to the drive shaft 119, and the pressure sensor 10 and the temperature sensor 30 serving as the measurement units are disposed between the first portion 11 and the second portion 21. The pressure sensor 10 serving as the measurement unit is a pressure sensor including a piezoelectric body. The piezoelectric body includes the piezoelectric element 3, and the first electrode 2 and the second electrode 4 that serve as electrodes.

The description is back to FIG. 6.

A right side of the center line 60 in FIG. 6 shows a cross section of the temperature sensor 30. As illustrated in FIG. 6, the temperature sensor 30 is provided at the bottom surface 11b of the cavity 11a of the first portion 11. In a preferred example, the temperature sensor 30 is a fiber Bragg grating (FBG) sensor implemented by an optical fiber. Specifically, the temperature sensor 30 includes a periodic diffraction grating 30a formed inside one optical fiber. The diffraction grating 30a is a portion whose refractive index is modulated, and reflects only light having a wavelength satisfying a Bragg reflection condition generated based on a period of the diffraction grating 30a. A temperature can be measured by observing a Bragg wavelength of the reflected light. The temperature sensor 30 can also measure deformation.

A light source that emits light to the optical fiber and a measuring instrument that receives reflected light to measure a temperature and a pressure are coupled to the temperature sensor 30. The control unit 190 acquires the measured temperature from the measuring instrument (not illustrated) coupled to the optical fiber.

The temperature sensor 30 is not limited to the FBG sensor, and any temperature sensor having high heat resistance may be used, for example, a thermocouple sensor.

Figure 9:
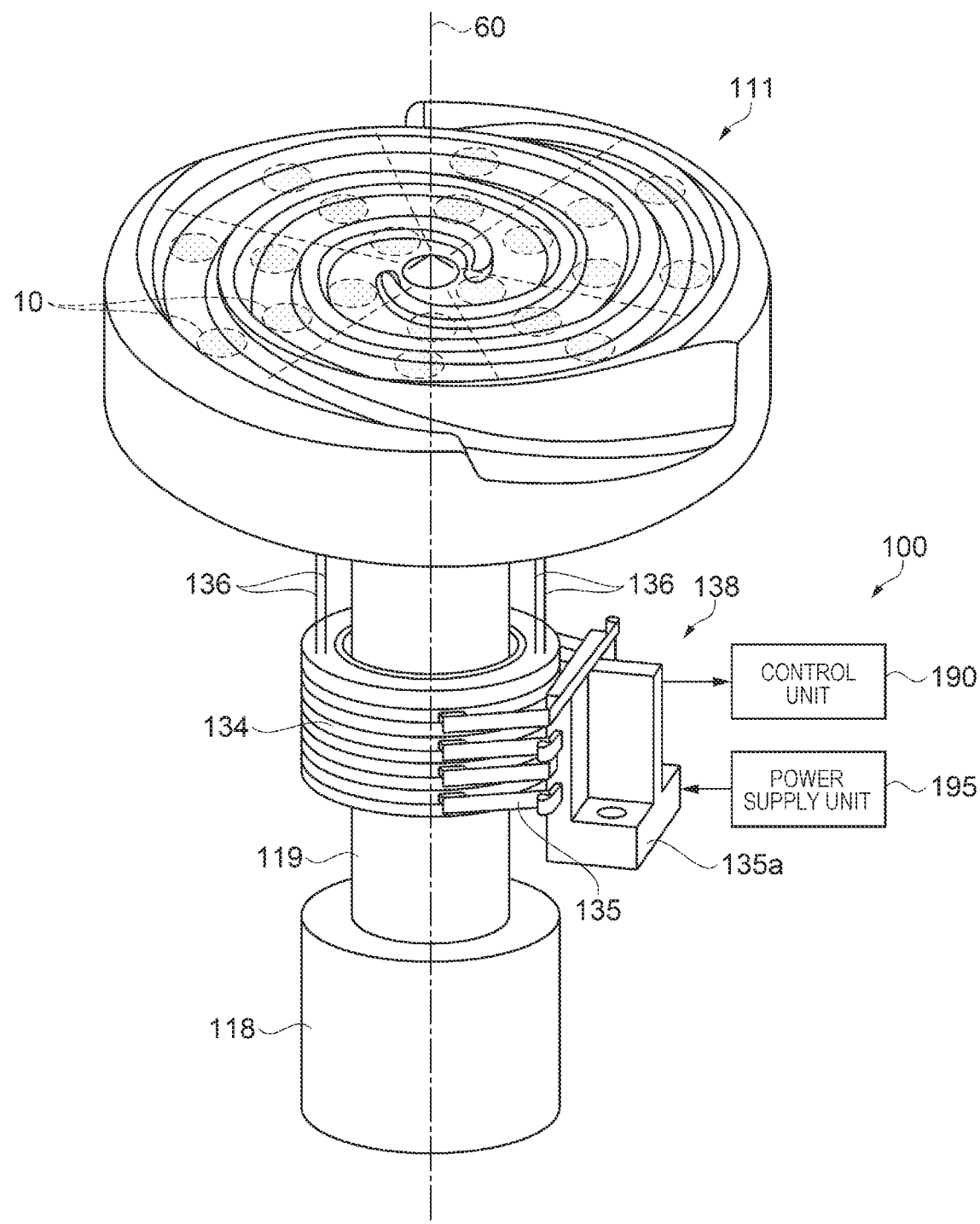
FIG. 9 is a schematic diagram illustrating an example of a wiring mode of a pressure sensor.

FIG. 9 is a schematic diagram illustrating an example of a wiring mode of the pressure sensor.

Since the screw 111 rotates with the drive shaft 119 serving as a rotation shaft, the pressure sensor 10 also rotates. Therefore, it is necessary to devise a wiring configuration for exchanging pressure data detected by the pressure sensor 10, driving power, and the like with the plasticizing device 100.

Specifically, as illustrated in FIG. 9, the drive shaft 119 of the drive motor 118 is provided with a slip ring portion 138. The slip ring portion 138 is a rotary connector that enables electrical coupling while rotating, and includes a ring portion 134, a brush portion 135, and the like.

The ring portion 134 is attached to the drive shaft 119, and rotates together with the drive shaft 119. A plurality of wirings 136 are provided between the ring portion 134 and the screw 111. The plurality of wirings 136 are coupled to the pressure sensor 10 and rotate together with the drive shaft 119. The ring portion 134 is provided with a plurality of metal ring bodies corresponding to the plurality of wirings 136.

The brush portion 135 is provided at a side surface of the ring portion 134. The brush portion 135 is provided with coupling brushes corresponding to the ring bodies of the ring portion 134. The brush portion 135 is supported by a support portion 135a, and the support portion 135a is fixed to the plasticizing device 100. That is, the brush portion 135 is stationary regardless of the rotation of the drive shaft 119.

With such a configuration, even when the screw 111 rotates, electric signals of the pressure data, driving power and the like can be continuously exchanged via the plurality of wirings 136.

Arrangement Mode of Sensors in Barrel and Peripheral Portion Thereof

Figure 11:
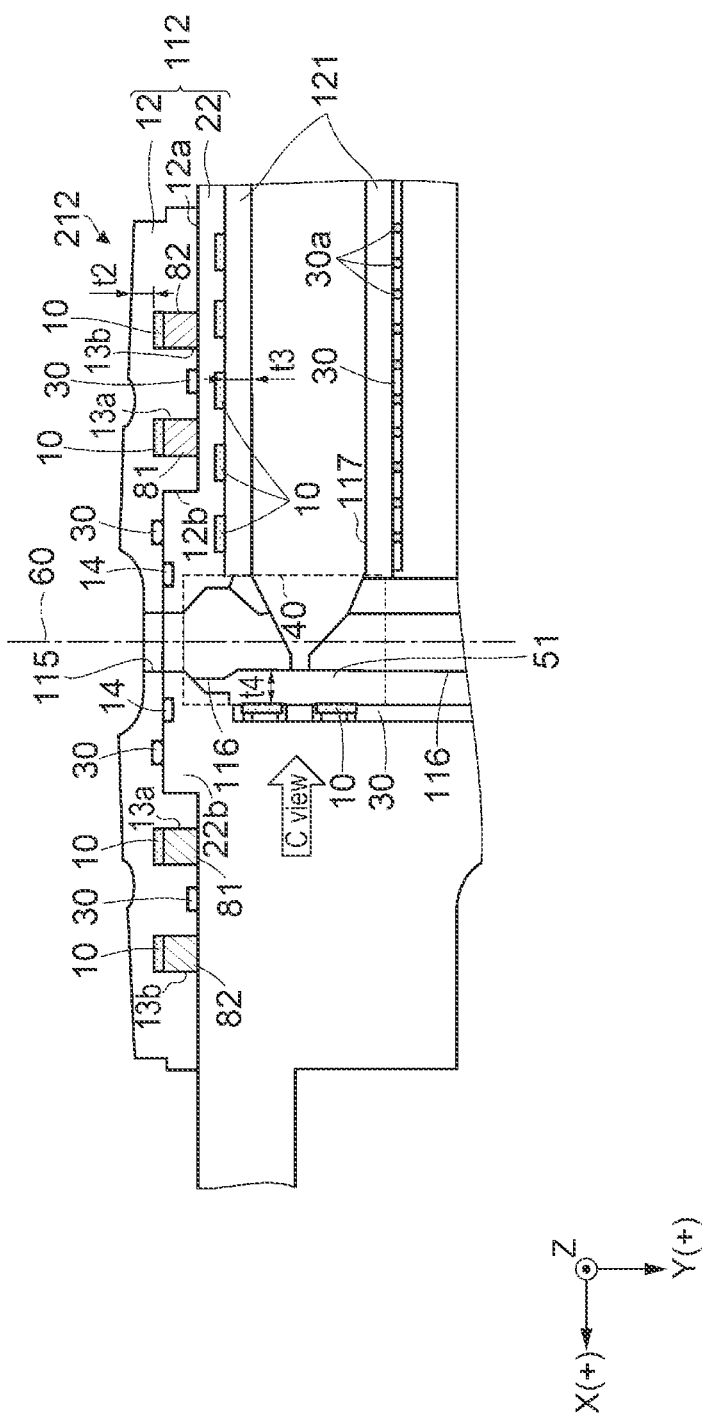
FIG. 11 is a cross-sectional view of the barrel.

FIG. 10 is a plan view of the barrel. FIG. 11 is a cross-sectional view of the barrel.

Here, an arrangement mode of the pressure sensor 10 and the temperature sensor 30 in the barrel 112 and a peripheral portion thereof will be described with reference to FIGS. 10 and 11.

As illustrated in FIG. 10, the barrel 112 includes two portions, that is, a third portion 12 and a fourth portion 22. The third portion 12 is a circular plate-shaped portion having the facing surface 212, and is disposed at a center of the fourth portion 22 serving as a base portion. In a preferred example, both the third portion 12 and the fourth portion 22 are made of stainless steel. The third portion 12 and the fourth portion 22 may be made of aluminum. As illustrated in FIG. 10, the two heaters 81 and 82 are concentrically provided in the facing surface 212 of the barrel 112 around the communication hole 115. The plurality of pressure sensors 10 are arranged at portions overlapping the two heaters 81 and 82 in the plan view.

Two temperature sensors 30 are provided, and one temperature sensor 30 is concentrically disposed between the communication hole 115 and the heater 81 in the plan view. The other one is concentrically disposed between the heater 81 and the heater 82.

As illustrated in FIG. 11, the fourth portion 22 is provided with a protrusion 22b centered on the communication hole 115. The third portion 12 is provided with a cavity 12b that is a recess formed by digging down from a bottom surface 12a. The third portion 12 is coupled to the fourth portion 22 by fitting the protrusion 22b into the cavity 12b. A washer 14 is provided around the communication hole 115 in the protrusion 22b. The washer 14 is a ring-shaped washer made of aluminum, and prevents the material from laterally leaking from the communication hole 115 through a joint surface between the third portion 12 and the fourth portion 22.

The pressure sensors 10 and the temperature sensors 30 are disposed between the third portion 12 and the fourth portion 22.

First, an arrangement mode of the pressure sensors 10 will be described.

As illustrated in FIG. 11, the bottom surface 12a of the third portion 12 is formed with a first groove 13a and a second groove 13b that are annular grooves for setting the heaters 81 and 82. The pressure sensors 10 are disposed at the bottom of the first groove 13a and the second groove 13b. That is, the pressure sensor 10 is disposed between the facing surface 212 and the heater 81. Similarly, the pressure sensor 10 is disposed between the facing surface 212 and the heater 82.

In other words, the heaters 81 and 82 serving as the heating units are disposed in the barrel 112, and the pressure sensors 10 serving as the measurement units are disposed at positions facing the facing surface 212 of the heaters 81 and 82.

The first temperature sensor 30 is disposed at a bottom portion of the cavity 12b of the third portion 12. The second temperature sensor 30 is disposed between the first groove 13a and the second groove 13b at the bottom surface of the third portion 12.

In other words, the barrel 112 includes the third portion 12 having the facing surface 212 and the fourth portion 22 that is separate from the third portion 12 and that does not have the facing surface 212, and the pressure sensors 10 and the temperature sensors 30 serving as the measurement units are disposed between the third portion 12 and the fourth portion 22.

As illustrated in FIG. 11, the pressure sensors 10 and the temperature sensors 30 are also disposed at outer sides of the cylinder 121. Specifically, at the outer side of the cylinder 121 on a heaters 81 and 82 side, a plurality of pressure sensors 10 are arranged along an extending direction of the cylinder 121. In addition, at the opposite outer side of the cylinder 121, one temperature sensor 30 is disposed along the extending direction of the cylinder 121. Accordingly, a state of the material in the branch channel 117 of the cylinder 121 can be grasped.

In FIG. 11, a portion, which is surrounded by a dotted line and includes a merging portion with the branch channel 117 downstream of the communication hole 115, is referred to as a check valve pressing portion 40. The pressure sensor 10 and the temperature sensor 30 are also disposed at an outer side of the check valve pressing portion 40.

Figure 12:
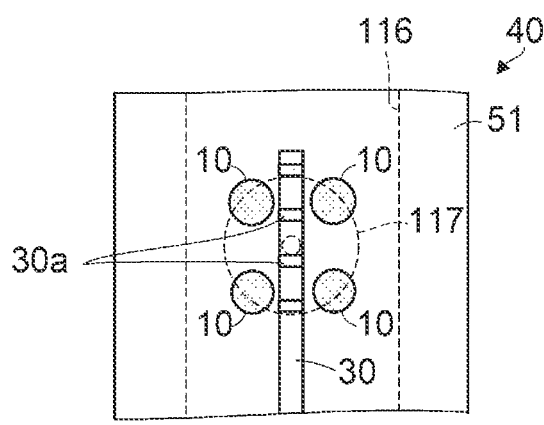
FIG. 12 is an enlarged view of C view in FIG. 11.

FIG. 12 is an enlarged view of C view in FIG. 11.

FIG. 12 is a view of the check valve pressing portion 40 viewed in the −X side, and illustrates an outer side of a tubular portion 51 constituting the channel 116.

As illustrated in FIG. 12, at the outer side of the tubular portion 51, the pressure sensors 10 are disposed at four positions of a portion facing the branch channel 117. The four pressure sensors 10 surround the branch channel 117.

One temperature sensor 30 is disposed along an extending direction of the channel 116, at a center of the outer side of the tubular portion 51. As illustrated in FIG. 12, the four pressure sensors 10 and the temperature sensor 30 are disposed at the outer side of the tubular portion 51 in a manner of not overlapping each other.

Arrangement Mode of Sensors in Nozzle

Figure 13:
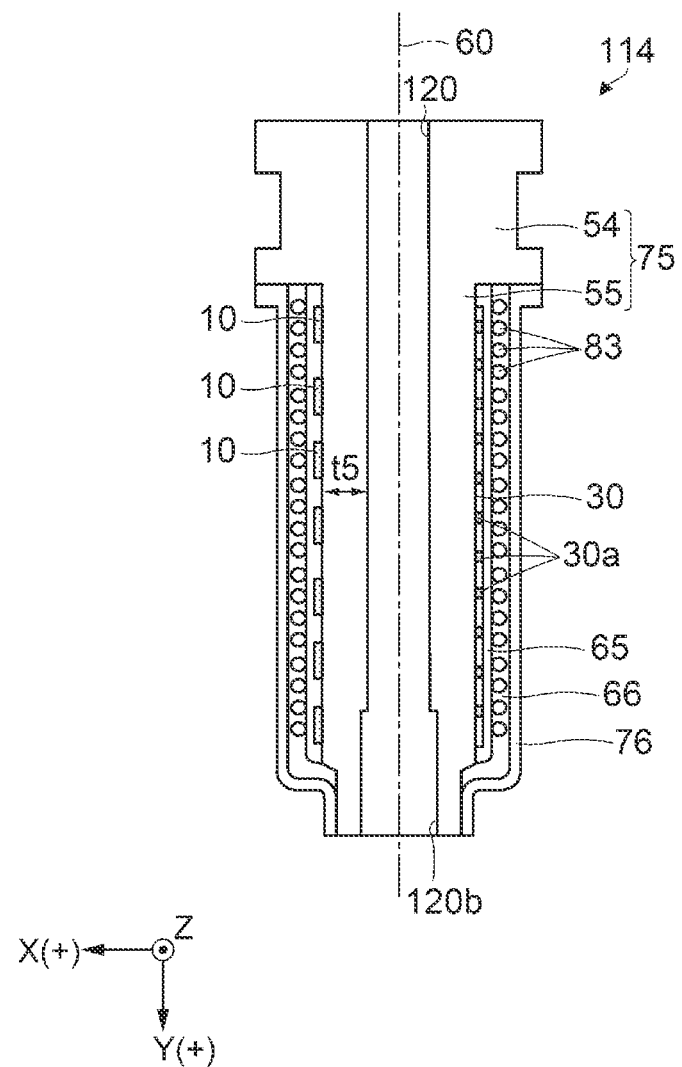
FIG. 13 is a cross-sectional view of a nozzle.

FIG. 13 is a cross-sectional view of the nozzle.

Here, an arrangement mode of the pressure sensor 10 and the temperature sensor 30 in the nozzle 114 will be described with reference to FIG. 13.

The nozzle 114 includes a main body 75, a heater 83, a cap member 76, and the like. The nozzle 114 is a hot runner and is also referred to as a microprobe.

The main body 75 includes a coupling portion 54 that is a joint portion with the plasticizing device 100, and a cylindrical portion 55 that extends from the coupling portion 54 in the +Y direction and is thinner than the coupling portion 54. Inside the main body 75, a channel 120 is provided along the center line 60. In a preferred example, the main body 75 is made of stainless steel. Alternatively, the main body 75 may be made of aluminum.

A female screw 120b is formed on an end side of the channel 120. A nozzle head (not illustrated) is screwed into the female screw 120b.

As illustrated in FIG. 13, at one outer side of the cylindrical portion 55, a plurality of pressure sensors 10 are arranged at regular intervals along an extending direction of the cylindrical portion 55. At the other outer side of the cylindrical portion 55, one temperature sensor 30 is disposed along the extending direction of the cylindrical portion 55. The arrangement mode is not limited thereto, and it is sufficient that the pressure sensor 10 and the temperature sensor 30 are arranged at an outer periphery of the cylindrical portion 55 in a manner of not overlapping each other.

An insulating layer 65 is deposited at the outer periphery of the cylindrical portion 55 in a manner of covering the pressure sensors 10 and the temperature sensor 30. In a preferred example, the insulating layer 65 is the same ceramic film as the insulating layer 6.

The heater 83 implemented by a heating-wire heater is wound around an outer side of the insulating layer 65. A wire of the coil is, for example, a nichrome wire. A molten state of the material flowing through the channel 120 is maintained by the heating of the heater 83.

An insulating layer 66 is deposited at an outer periphery of the heater 83 in a manner of covering the heater 83. In a preferred example, the insulating layer 66 is the same ceramic film as the insulating layer 6.

An outer side of the insulating layer 66 is covered with the cap member 76 that is a metal cap. In a preferred example, the cap member 76 is made of stainless steel. Alternatively, the main body 75 may be made of aluminum.

When forming the pressure sensor 10b by direct deposition at the cylindrical portion 55, functional layers may be laminated after an insulating layer is deposited at the outer periphery of the cylindrical portion 55 as described with reference to FIG. 8. The nozzle 114 is described as a hot runner. Alternatively, the nozzle 114 may be a cold runner, and in this case, the heater 83 may not be provided. Even in the case of the cold runner, a state in the channel 120 can be grasped with the pressure sensor 10 and the temperature sensor 30.

As described above, in the embodiment, as measurement units, a plurality of pressure sensors 10 and a plurality of temperature sensors 30 are disposed in at least one of the screw 111, the barrel 112, and the cylinder 121. As measurement units, the plurality of pressure sensors 10 and the plurality of temperature sensors 30 may be disposed in any portion constituting a channel, such as the check valve pressing portion 40 and the nozzle 114.

Suitable Installation Mode of Pressure Sensor

FIG. 14 is a table illustrating a simulation result of a pressure sensor installation position.

As described above, in the embodiment, the arrangement modes of the pressure sensor 10 in the portions from upstream of the channel to downstream of the channel are described.

Here, in order to efficiently detect deflection of the channel caused by the flow of the material, a distance between the channel and the pressure sensor 10 is preferably short. On the other hand, it is necessary to ensure a strength of a structure of each portion constituting the channel.

A table 91 in FIG. 14 is a list of simulation results derived in view of the above, and the maximum thickness of each portion is calculated for each material.

First, the nozzle 114 in FIG. 13 will be taken as an example and described.

As illustrated in FIG. 13, the pressure sensor 10 for detecting a pressure fluctuation in the channel 120 is attached to the outer side of the cylindrical portion 55 of the nozzle 114. A distance between the channel 120 and the pressure sensor 10 is a thickness t5 of a channel wall of the cylindrical portion 55.

When a material of the nozzle 114 is stainless steel, a Young's modulus E is about 202 Gpa. A rigidity of the channel wall is obtained using the following formula (1). Further, i, which is a geometrical moment of area, is obtained using a formula (2).

$$\text{Rigidity} = E*I \quad (1)$$

$$i = (b*t^3/12) \quad (2)$$

Note that b is a length of a beam.

When the material of the nozzle 114 is stainless steel, the minimum thickness t5 of the channel wall is 0.2 mm in order to ensure the strength of the structure based on the rigidity obtained using the formula (1).

The maximum thickness t5 of the channel wall is 2.5 mm as shown in the table 91. When a thickness of the channel wall is larger than the maximum thickness t5, a pressure detection is difficult. Values in the table 91 are numerical values obtained by calculating the thickness t based on the formula (2).

Similarly, when a cemented carbide is used, the minimum thickness t5 of the channel wall is 0.2 mm, and the maximum thickness t5 of the channel wall is 2.0 mm. Similarly to stainless steel, the cemented carbide is a material containing iron as a main component.

When the material of the nozzle 114 is aluminum, the minimum thickness t5 of the channel wall is 0.2 mm in order to ensure the strength of the structure based on the rigidity obtained using the formula (1). The maximum thickness t5 of the channel wall is 4.0 mm as shown in the table 91. When the thickness of the channel wall is larger than the maximum thickness t5, the pressure detection is difficult.

In other words, the thickness t5 of the channel wall of the cylindrical portion 55 of the nozzle 114 satisfies the following (1) or (2).

(1) When the nozzle channel wall is made of a material containing iron as a main component, the thickness t5 of the nozzle channel wall is 0.2 mm or more and 2.5 mm or less.

(2) When the nozzle channel wall is made of a material containing aluminum as a main component, the thickness t5 of the nozzle channel wall is 0.2 mm or more and 4 mm or less.

In FIG. 14, numerical values in a case where the material of the nozzle 114 is a resin are also recorded as a comparative example. When a resin is used, it is preferable to use a resin having high heat resistance or a resin having a high heat-resistant grade.

Hereinafter, the simulation results of the portions will be described in the same manner as described above.

In the screw 111 illustrated in FIG. 6, a distance between the bottom portion of the groove 202 of the groove formation surface 201 and the pressure sensor 10 is a thickness t1 of the first portion 11.

When a material of the first portion 11 is stainless steel, the minimum thickness t1 of the first portion 11 is 0.2 mm in order to ensure the strength of the structure based on the rigidity obtained using the formula (1).

As shown in the table 91, the maximum thickness t1 of the first portion 11 is 10.0 mm, and when a thickness of the first portion 11 is larger than the maximum thickness t1, a pressure detection is difficult.

Similarly, when a cemented carbide is used, the minimum thickness t1 of the first portion 11 is 0.2 mm. The maximum thickness t1 of the first portion 11 is 7.0 mm. Similarly to stainless steel, the cemented carbide is a material containing iron as a main component.

When the material of the first portion 11 is aluminum, the minimum thickness t1 of the first portion 11 is 0.2 mm in order to ensure the strength of the structure based on the rigidity obtained using the formula (1). As shown in the table 91, the maximum thickness t1 of the first portion 11 is 14.0 mm, and when the thickness of the first portion 11 is larger than the maximum thickness t1, a pressure detection is difficult.

In other words, when the first portion 11 is made of a material containing iron as a main component, the thickness t1 of the first portion 11 is 0.2 mm or more and 10 mm or less, and when the first portion 11 is made of a material containing aluminum as a main component, the thickness t1 of the first portion 11 is 0.2 mm or more and 14 mm or less.

In the barrel 112 illustrated in FIG. 11, a distance between the facing surface 212 and the pressure sensor 10 is a thickness t2 of the third portion 12.

When a material of the third portion 12 is stainless steel, the minimum thickness t2 of the third portion 12 is 0.2 mm in order to ensure the strength of the structure based on the rigidity obtained using the formula (1).

As shown in the table 91, the maximum thickness t2 of the third portion 12 is 15.0 mm, and when a thickness of the third portion 12 is larger than the maximum thickness t2, a pressure detection is difficult.

Similarly, when a cemented carbide is used, the minimum thickness t2 of the third portion 12 is 0.2 mm. The maximum thickness t2 of the third portion 12 is 10.0 mm.

When the material of the third portion 12 is aluminum, the minimum thickness t2 of the third portion 12 is 0.2 mm in order to ensure the strength of the structure based on the rigidity obtained using the formula (1). As shown in the table 91, the maximum thickness t2 of the third portion 12 is 21.0 mm, and when the thickness of the third portion 12 is larger than the maximum thickness t2, a pressure detection is difficult.

In other words, when the third portion 12 is made of a material containing iron as a main component, the thickness t2 of the third portion 12 is 0.2 mm or more and 15 mm or less, and when the third portion 12 is made of a material containing aluminum as a main component, the thickness t2 of the third portion 12 is 0.2 mm or more and 21 mm or less.

In the cylinder 121 illustrated in FIG. 11, a distance between the branch channel 117 and the pressure sensor 10 is a thickness t3 of a wall of the cylinder 121.

When a material of the cylinder 121 is stainless steel, the minimum thickness t3 of the wall of the cylinder 121 is 0.2 mm in order to ensure the strength of the structure based on the rigidity obtained using the formula (1). As shown in the table 91, the maximum thickness t3 of the wall of the cylinder 121 is 5.5 mm, and when a thickness of the wall of the cylinder 121 is larger than the maximum thickness t3, a pressure detection is difficult. Similarly, when a cemented carbide is used, the minimum thickness t3 of the wall of the cylinder 121 is 0.2 mm. The maximum thickness t3 of the wall of the cylinder 121 is 4.0 mm.

In other words, when the cylinder 121 is made of a material containing iron as a main component, the thickness t3 of the wall of the cylinder 121 is 0.2 mm or more and 5.5 mm or less, and when the cylinder 121 is made of a material containing aluminum as a main component, the thickness t3 of the wall of the cylinder 121 is 0.2 mm or more and 8.0 mm or less.

In the check valve pressing portion 40 illustrated in FIG. 11, a distance between the channel 116 and the pressure sensor 10 is a thickness t4 of a wall of the tubular portion 51.

When a material of the tubular portion 51 is stainless steel, the minimum thickness t4 of the wall of the tubular portion 51 is 0.2 mm in order to ensure the strength of the structure from the rigidity obtained using the formula (1). As shown in the table 91, the maximum thickness t4 of the wall of the tubular portion 51 is 11.0 mm, and when a thickness of the wall of the tubular portion 51 is larger than the maximum thickness t4, a pressure detection is difficult. Similarly, when a cemented carbide is used, the minimum thickness t4 of the wall of the tubular portion 51 is 0.2 mm. The maximum thickness t4 of the wall of the tubular portion 51 is 8.0 mm.

In other words, when the tubular portion 51 is made of a material containing iron as a main component, the thickness t4 of the wall of the tubular portion 51 is 0.2 mm or more and 11.0 mm or less, and when the tubular portion 51 is made of a material containing aluminum as a main component, the thickness t4 of the wall of the tubular portion 51 is 0.2 mm or more and 16.0 mm or less.

As described above, according to the material discharge device 110, the plasticizing device 100, and the nozzle 114 according to the embodiment, the following effects can be attained.

The material discharge device 110 includes: the drive motor 118; the screw 111 that has the groove formation surface 201 formed with the groove 202 and that rotates about the drive shaft 119 of the drive motor 118; the barrel 112 that has the facing surface 212 facing the groove formation surface 201 and in which the communication hole 115 is formed through which a plasticized material flows; the heaters 81 and 82 serving as heating units that heat the material supplied to the groove 202; the nozzle 114 that communicates with the communication hole 115 and from which the plasticized material is injected to the outside; and a plurality of pressure sensors 10 and a plurality of temperature sensors 30 serving as measurement units that measure pressures or temperatures of the material at a plurality of locations in a channel through which the material passes. The measurement units are disposed at an outer periphery of a nozzle channel wall that defines the channel 120 in the nozzle 114, and the thickness t5 of the channel wall of a cylindrical portion 55 of the nozzle 114 satisfies the following (1) or (2).

(1) When the nozzle channel wall is made of a material containing iron as a main component, the thickness t5 of the nozzle channel wall is 0.2 mm or more and 2.5 mm or less.

(2) When the nozzle channel wall is made of a material containing aluminum as a main component, the thickness t5 of the nozzle channel wall is 0.2 mm or more and 4 mm or less.

According to this, since it is possible to measure the pressure at a plurality of points in the channel 120 of the nozzle 114, unlike a related-art configuration in which the pressure at one point in the channel is measured, it is possible to accurately grasp and analyze the state of the shaping material in the channel 120.

Further, since the installation position of the pressure sensor 10 in the channel is optimized, the pressure can be accurately measured.

Accordingly, since accurate feedback control can be performed, a discharge amount of the shaping material can be accurately controlled.

Accordingly, it is possible to provide the material discharge device 110 capable of stably supplying a plasticized material.

Further, since the temperature can be measured at a plurality of points in the channel 120, the state of the shaping material in the channel 120 can be more accurately grasped and analyzed.

Accordingly, since more accurate feedback control can be performed, the discharge amount of the shaping material can be more accurately controlled.

Accordingly, it is possible to provide the material discharge device 110 capable of supplying the plasticized material more stably.

The material discharge device 110 further includes the cylinder 121 having the branch channel 117 branched from the communication hole 115, and the suction and delivery portion 90 including the plunger 122 that reciprocates in the cylinder 121 to suction the plasticized material or to deliver the suctioned material to the channel. As measurement units, a plurality of pressure sensors 10 and a plurality of temperature sensors 30 are disposed in at least one of the screw 111, the barrel 112, and the cylinder 121.

According to this, since a plurality of measurement units are provided at portions constituting the channel, the state of the shaping material in the channel can be accurately grasped and analyzed.

The screw 111 is a flat screw. In the screw 111, the length in the direction in which the drive shaft 119 extends is smaller than the length in the direction perpendicular to the direction in which the drive shaft 119 extends. The groove formation surface 201 and the facing surface 212 face each other in the direction in which the drive shaft 119 extends. The screw 111 includes the first portion 11 having the groove formation surface 201, and the second portion 21 that is separate from the first portion 11 and that is coupled to the drive shaft 119. The pressure sensors 10 and the temperature sensors 30 serving as the measurement units are disposed between the first portion 11 and the second portion 21.

According to this, since the measurement units can be disposed directly below the groove formation surface 201 having the groove 202, the state of the shaping material can be more accurately grasped and analyzed.

When the first portion 11 is made of a material containing iron as a main component, the thickness t1 of the first portion 11 is 0.2 mm or more and 10 mm or less, and when the first portion 11 is made of a material containing aluminum as a main component, the thickness t1 of the first portion 11 is 0.2 mm or more and 14 mm or less.

According to this, since the installation position of the pressure sensor 10 with respect to the groove 202 of the groove formation surface 201 is optimized, the pressure can be accurately measured.

The barrel 112 includes the third portion 12 having the facing surface 212, and the fourth portion 22 that is separate from the third portion 12 and that does not have the facing surface 212. The pressure sensors 10 and the temperature sensors 30 serving as measurement units are disposed between the third portion 12 and the fourth portion 22.

According to this, since the measurement units can be disposed directly below the facing surface 212, the state of the shaping material can be more accurately grasped and analyzed.

When the third portion 12 is made of a material containing iron as a main component, the thickness t2 of the third portion 12 is 0.2 mm or more and 15 mm or less, and when the third portion 12 is made of a material containing aluminum as a main component, the thickness t2 of the third portion 12 is 0.2 mm or more and 21 mm or less.

According to this, since the installation position of the pressure sensor 10 with respect to the facing surface 212 is optimized, the pressure can be accurately measured.

The heaters 81 and 82 serving as heating units are disposed in the barrel 112, and the pressure sensors 10 serving as the measurement units are disposed at positions facing the facing surface 212 of the heaters 81 and 82.

According to this, since the pressure sensor 10 is disposed directly below the facing surface 212, the pressure can be more accurately measured.

The pressure sensor 10 serving as the measurement unit is a pressure sensor including a piezoelectric body. The piezoelectric body includes the piezoelectric element 3, and the first electrode 2 and the second electrode 4 that serve as electrodes.

According to this, since the pressure sensor 10 has high heat resistance and is compact, the pressure sensor 10 can be easily disposed at a portion constituting the channel.

The pressure sensor 10b is formed by deposition in at least one of the nozzle 114, the screw 111, the barrel 112, and the cylinder 121.

According to this, it is possible to form the pressure sensor 10b by deposition at portions constituting the channel.

The injection molding device 200 includes the material discharge device 110, and the fixed-mold support portion 141 and the movable-mold support portion 142 as fixing portions that fix the mold 160. The mold 160 receives the material discharged from the material discharge device 110.

According to this, since the material discharge device 110 capable of stably supplying the plasticized material is provided, the injection molding device 200 capable of stably performing injection molding can be provided.

The nozzle 114, from which a plasticized material is injected, includes a channel wall of the cylindrical portion 55 serving as a nozzle channel wall defining the channel 120 through which the material flows. At an outer periphery of the cylindrical portion 55, a plurality of pressure sensors 10 and a plurality of temperature sensors 30 serving as measurement units that measure pressures or temperatures of the material at a plurality of locations in the channel 120 are provided. The thickness t5 of the channel wall of the cylindrical portion 55 of the nozzle 114 satisfies the following (1) or (2).

(1) When the nozzle channel wall is made of a material containing iron as a main component, the thickness t5 of the nozzle channel wall is 0.2 mm or more and 2.5 mm or less.

(2) When the nozzle channel wall is made of a material containing aluminum as a main component, the thickness t5 of the nozzle channel wall is 0.2 mm or more and 4 mm or less.

According to this, since it is possible to measure the pressure at a plurality of points in the channel 120 of the nozzle 114, it is possible to accurately grasp and analyze the state of the shaping material in the channel 120. Further, since the temperature can be measured at a plurality of points in the channel 120, the state of the shaping material in the channel 120 can be more accurately grasped and analyzed. Accordingly, since more accurate feedback control can be performed, the discharge amount of the shaping material can be more accurately controlled.

Accordingly, it is possible to provide the nozzle 114 capable of stably supplying the plasticized material.

The plasticizing device 100 includes: the drive motor 118; the screw 111 that has the groove formation surface 201 formed with the groove 202 and that rotates around the drive shaft 119 of the drive motor 118; the barrel 112 that has the facing surface 212 facing the groove formation surface 201 and in which a communication hole 115 is formed through which a plasticized material flows; the heaters 81 and 82 as heating units that heat the material supplied to the groove 202; and a plurality of pressure sensors 10 and a plurality of temperature sensors 30 serving as measurement units that measure a pressure or a temperature of the material on the facing surface 212. The barrel 112 includes the third portion 12 having the facing surface 212, and the fourth portion 22 that is separate from the third portion 12 and that does not have the facing surface 212. The pressure sensor 10 and the temperature sensor 30 serving as measurement units are disposed between the third portion 12 and the fourth portion 22. The thickness t2 of the third portion 12 satisfies the following (1) or (2).

(1) When the third portion 12 is made of a material containing iron as a main component, the thickness t2 of the third portion 12 is 0.2 mm or more and 15 mm or less.

(2) When the third portion 12 is made of a material containing aluminum as a main component, the thickness t2 of the third portion 12 is 0.2 mm or more and 21 mm or less.

According to this, since it is possible to measure the pressure at a plurality of points on the facing surface 212 of the barrel 112, it is possible to accurately grasp and analyze the state of the shaping material. Further, since the temperature can be measured at a plurality of points on the facing surface 212, the state of the shaping material can be more accurately grasped and analyzed. Accordingly, since more accurate feedback control can be performed, the discharge amount of the shaping material can be more accurately controlled.

Accordingly, it is possible to provide the plasticizing device 100 capable of stably supplying the plasticized material.

Second Embodiment

Different Mode of Barrel

Figure 15:
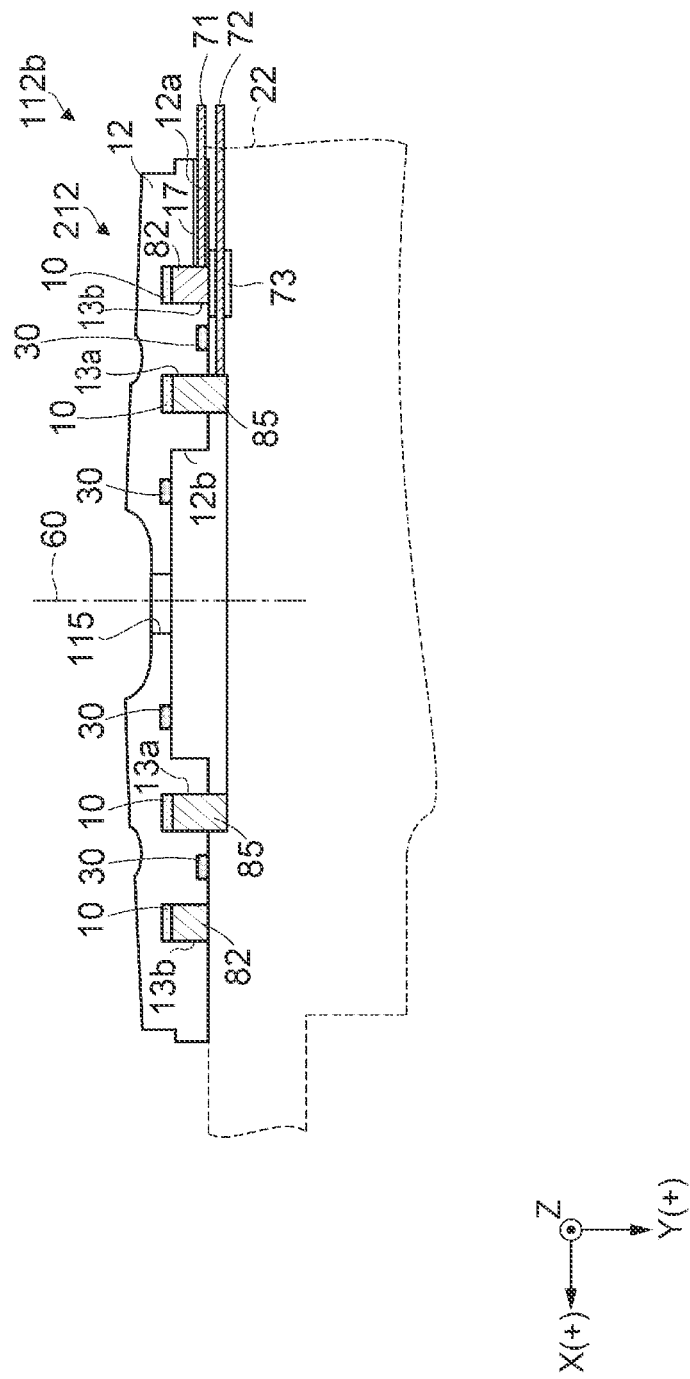
FIG. 15 is a cross-sectional view of a barrel according to a second embodiment.
Figure 16:
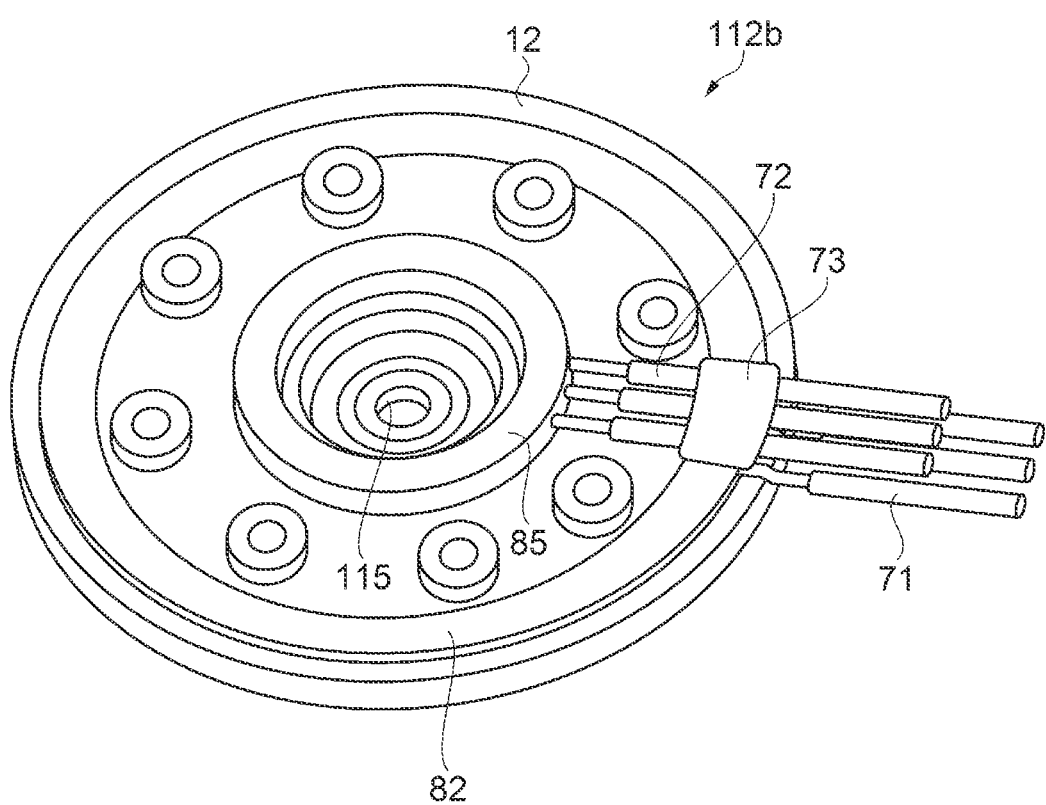
FIG. 16 is a perspective view of the barrel.

FIG. 15 is a cross-sectional view of a barrel according to a second embodiment and corresponds to FIG. 11. FIG. 16 is a perspective view of the barrel.

In the above-described embodiment, the heaters 81 and 82 have the same thickness, but the present disclosure is not limited to this configuration, and the thickness of the inner heater may be increased. For example, in a barrel 112b according to the embodiment, a thickness of a heater 85 on a communication hole 115 side is larger than that of the outer heater 82. Accordingly, a wiring 72 drawn out from the heater 85 and a wiring 71 drawn out from the heater 82 can be drawn out in a manner of overlapping each other in the −X direction. Hereinafter, the same reference signs are assigned to the same portions as those in the above-described embodiment, and the redundant description thereof will be omitted.

As illustrated in FIG. 15, in the barrel 112b according to the embodiment, the thickness of the heater 85 on the communication hole 115 side is larger than that of the outer heater 82. Specifically, the heater 85 is larger in the thickness than the bottom surface 12a of the third portion 12.

In FIG. 15, the wirings 71 and 72 electrically coupled to the heaters 82 and 85 are illustrated. The wiring 71 is drawn out from the heater 82 in the −X direction. A groove 17 through which the wiring 71 passes is formed in the bottom surface 12a of the third portion 12.

The wiring 72 is drawn out from the heater 85 in the −X direction. The wiring 72 overlaps the heater 82, and extends from the heater 82 while overlapping the wiring 71.

As illustrated in FIG. 16, a portion of the wiring 72 overlapping the heater 82 is entirely covered with a heat-resistant tube 73. Accordingly, damage to the wiring 72 due to heat of the heater 82 is prevented. The present disclosure is not limited to the configuration in which the thickness of the heater 85 is increased, and it is sufficient that the wiring 72 is relatively higher. For example, the thickness of the heater 85 may be the same as that of the heater 82, and the heater 85 may protrude from the bottom surface 12a by reducing a depth of the first groove 13a into which the heater 85 is placed. Alternatively, the thickness of the heater 85 may be the same as that of the heater 82, and the heater 85 may be set to be inclined with respect to the bottom surface 12a so that a height of the wiring 72 on a drawing-out side is greater than that of the heater 82.

In other words, the heaters 85 and 82 serving as heating units are disposed in the barrel 112b, and the heater 85 serving as a second heating unit is disposed closer to the communication hole 115 than is the heater 82 serving as a first heating unit. The heater 85 and the heater 82 are separately controlled, and the thickness of the heater 85 in the extending direction of the drive shaft 119 is larger than the thickness of the heater 82. Further, the heater 85 and the heater 82 each have a shape surrounding the communication hole 115 as viewed from the extending direction of the drive shaft 119, and are disposed in, for example, an annular shape or a polygonal shape.

As described above, according to the material discharge device 110 in the embodiment, the following effects can be attained in addition to the effects of the above-described embodiment.

According to the material discharge device 110, the heaters 85 and 82 serving as heating units are disposed in the barrel 112b, and the heater 85 serving as a second heating unit is disposed closer to the communication hole 115 than is the heater 82 serving as a first heating unit. The heater 85 and the heater 82 are separately controlled, and the thickness of the heater 85 in the extending direction of the drive shaft 119 is larger than the thickness of the heater 82.

As a heater wiring processing method in the related art, for example, there is a method of drawing out the wiring 72 of the heater 85 to a fourth portion 22 side. Specifically, a through hole is formed in the fourth portion 22, the wiring 72 passes through the through hole and is drawn out from a lower side (−Y side) of the fourth portion 22, and a coupling connector is attached to an end portion of the wiring 72 and is coupled to the control unit 190. The same applies to the wiring 71 of the heater 82. According to this method in the related art, when detaching the heater 85 for maintenance, the coupling connector may be caught by the through hole, making the detachment troublesome.

In contrast, according to the embodiment, the wiring 72 drawn out from the heater 85 and the wiring 71 drawn out from the heater 82 can be overlapped in the −X direction. Accordingly, since the set of the heater 85 and the wiring 72 and the set of the heater 82 and the wiring 71 can be easily detached from the third portion 12, the maintainability is good.

Accordingly, it is possible to provide the material discharge device 110 having good maintainability and capable of stably supplying the plasticized material.

The heater 85 and the heater 82 each have a shape surrounding the communication hole 115 as viewed from the extending direction of the drive shaft 119, and are disposed in, for example, an annular shape or a polygonal shape.

According to this, the third portion 12 having the facing surface 212 can be uniformly heated. Further, the set of the heater 85 and the wiring 72 overlaps the set of the heater 82 and the wiring 71 from above and thus can be easily detached, presenting good maintainability.

Third Embodiment

Three-Dimensional Shaping Device

Figure 17:
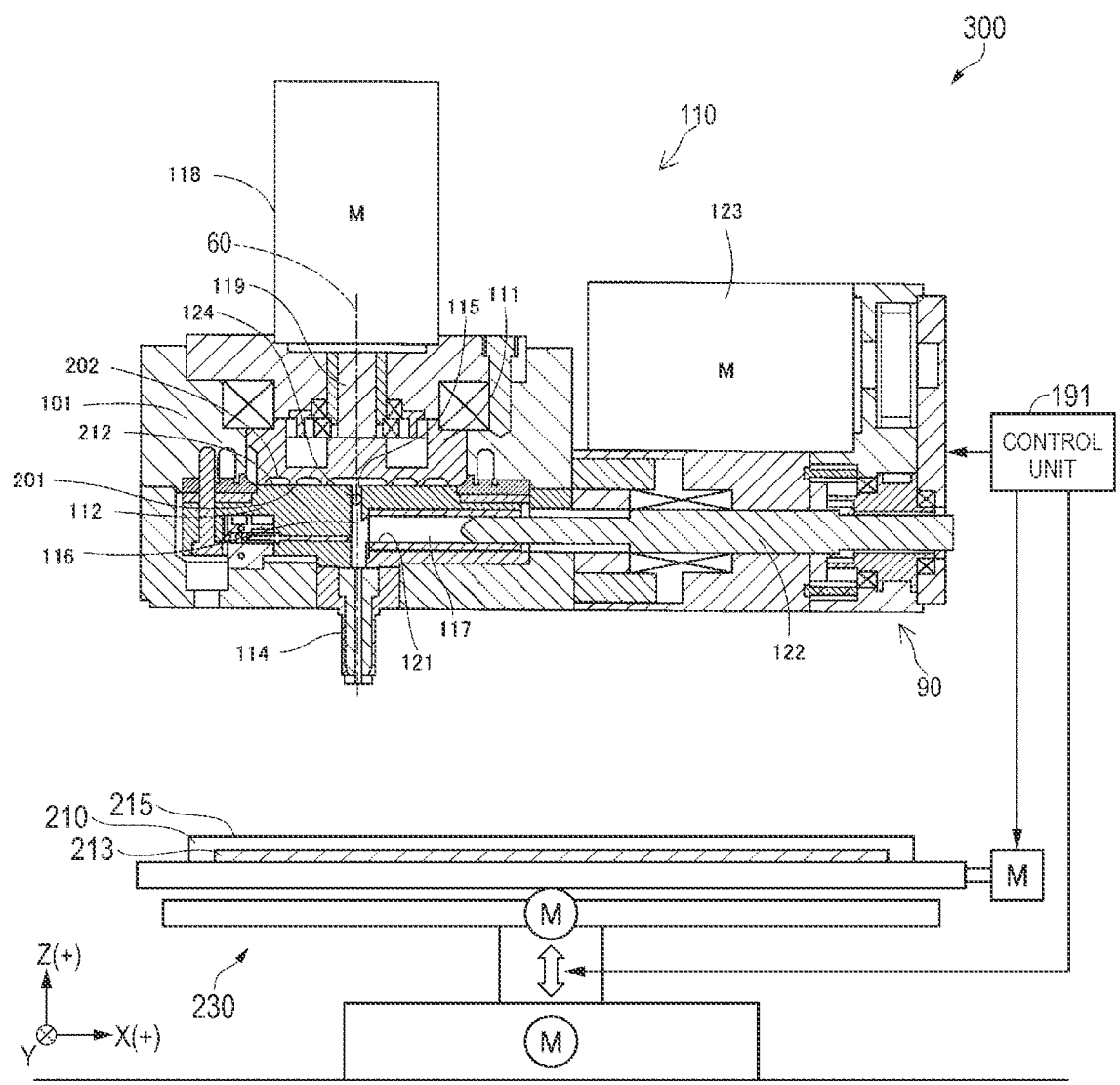
FIG. 17 is a schematic configuration diagram of a three-dimensional shaping device according to a third embodiment.

FIG. 17 is a schematic configuration diagram of a three-dimensional shaping device according to a third embodiment.

The material discharge device 110 according to the above-described embodiments can also be applied to a three-dimensional shaping device. Hereinafter, the same reference signs are assigned to the same portions as those in the above-described embodiment, and the redundant description thereof will be omitted.

A three-dimensional shaping device 300 according to the embodiment illustrated in FIG. 17 includes the material discharge device 110 configured to generate and discharge a shaping material made of a plasticized material, a stage 210 having a shaping surface 215 on which the shaping material is laminated, a position changing unit 230 configured to change a relative position between the nozzle 114 and the stage 210, and a control unit 191 configured to control the position changing unit 230.

The stage 210 is disposed at a position facing the nozzle 114. In the embodiment, the shaping surface 215 of the stage 210 facing the nozzle 114 is disposed parallel to the X and Y directions, that is, a horizontal direction. During three-dimensional shaping, the three-dimensional shaping device 300 discharges the shaping material from a tip of the nozzle 114 toward the shaping surface 215 of the stage 210 to laminate layers, thereby shaping a three-dimensional shaped object.

The stage 210 is provided with a stage heater 213 serving as a heating unit. The stage heater 213 prevents a rapid decrease in temperature of the shaping material discharged onto the stage 210.

The position changing unit 230 changes the relative position between the nozzle 114 and the stage 210. In the embodiment, a position of the nozzle 114 is fixed, and the position changing unit 230 moves the stage 210. The position changing unit 230 is implemented by a three-axis positioner that moves the stage 210 in three axial directions of X, Y, and Z directions by driving forces of three motors. The position changing unit 230 changes a relative positional relationship between the nozzle 114 and the stage 210 under the control of the control unit 191. The movement of the nozzle 114 means moving the nozzle 114 relative to the stage 210.

Instead of the configuration in which the position changing unit 230 moves the stage 210, a configuration may be adopted in which the position changing unit 230 moves the nozzle 114 with respect to the stage 210 in a state where the position of the stage 210 is fixed.

Alternatively, a configuration in which the position changing unit 230 moves the stage 210 in the Z direction and moves the nozzle 114 in the X and Y directions or a configuration in which the position changing unit 230 moves the stage 210 in the X and Y directions and moves the nozzle 114 in the Z direction may be adopted. With these configurations, the relative positional relationship between the nozzle 114 and the stage 210 can also be changed.

As described above, according to the three-dimensional shaping device 300 in the embodiment, the following effects can be attained.

The three-dimensional shaping device 300 includes the material discharge device 110 and the stage 210 having the shaping surface 215 on which a material is laminated.

According to this, since the three-dimensional shaping device 300 includes the material discharge device 110, the three-dimensional shaping device 300 can efficiently perform the 3D shaping using a material in a uniform plasticized state that is stably supplied. Accordingly, it is possible to provide the three-dimensional shaping device 300 having high shaping efficiency and excellent stability.

Modification, and Different Mode of Sensor

Figure 18:
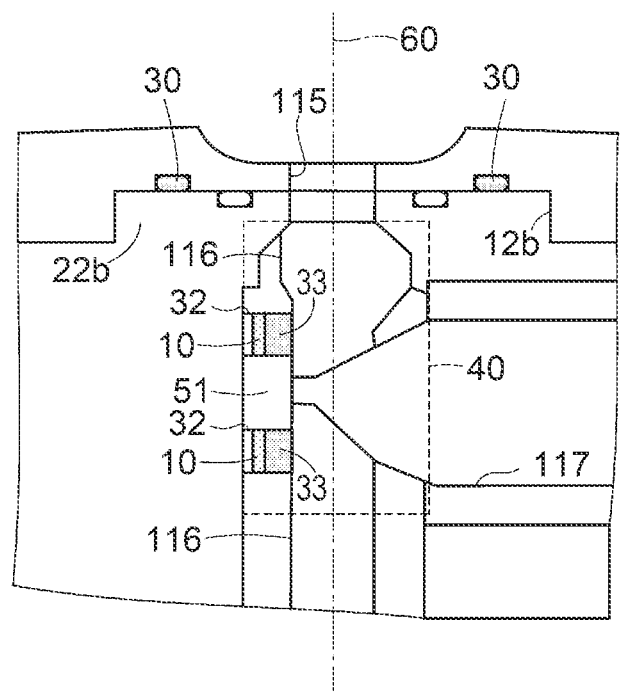
FIG. 18 is a diagram illustrating a different arrangement mode of a pressure sensor according to a modification.
Figure 18:
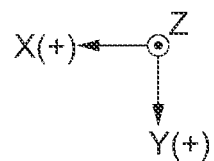

FIG. 18 is a diagram illustrating a different arrangement mode of a pressure sensor according to a modification, and corresponds to FIG. 11.

In the above-described embodiment, the measurement unit measures the temperature or pressure of the material in the channel via the channel wall, but the present disclosure is not limited to this configuration. For example, as illustrated in FIG. 18, a through hole 32 may be formed in the tubular portion 51 constituting the channel 116, and an attachment member 33 may be inserted into the through hole 32. The pressure sensor 10 is provided at an opposite side of the attachment member 33 from the channel 116, and measures a pressure in the channel 116 via the attachment member 33. Hereinafter, the same reference signs are assigned to the same portions as those in the above-described embodiment, and the redundant description thereof will be omitted.

In a preferred example, the attachment member 33 is made of the same material as the tubular portion 51. The attachment member 33 is preferably made of metal. The pressure sensor 10 may be attached to a back surface of the attachment member 33 after the attachment member 33 is inserted into the through hole 32. Alternatively, the attachment member 33 including the pressure sensor 10 may be inserted into the through hole 32.

According to this, for example, when the channel wall is thick, the attachment member 33 thinner than the channel wall can be inserted into the through hole 32, and thus pressure measurement can be performed at a position closer to the channel 116. Therefore, a state of the material can be grasped more accurately. In other words, a pressure in the channel can be measured regardless of the thickness of the channel wall.

Although an example in which a configuration using the attachment member 33 is applied to the pressure sensor 10 is illustrated in FIG. 18, the configuration using the attachment member 33 may also be applied to the temperature sensor 30. When applying the configuration to a temperature sensor, the temperature sensor is preferably a thermocouple sensor. In these cases, it is possible to attain the same effects as described above.

What is claimed is:

1. A material discharge device comprising:
   a drive motor;
   a screw having a groove formation surface formed with a groove, and configured to rotate around a rotation shaft;
   a barrel having a facing surface facing the groove formation surface, and formed with a communication hole through which a plasticized material flows;
   a heating unit configured to heat the material supplied to the groove;

a nozzle that communicates with the communication hole and from which the plasticized material is injected to an outside; and a plurality of measurement units configured to measure a pressure or a temperature of the material at a plurality of locations in a channel through which the material passes, wherein the measurement unit is disposed at an outer periphery of a nozzle channel wall that defines the channel in the nozzle, and a thickness of the nozzle channel wall satisfies following (1) or (2):
  (1) when the nozzle channel wall is made of a material containing iron as a main component, the thickness of the nozzle channel wall is 0.2 mm or more and 2.5 mm or less; and
  (2) when the nozzle channel wall is made of a material containing aluminum as a main component, the thickness of the nozzle channel wall is 0.2 mm or more and 4 mm or less.

2. The material discharge device according to claim 1, further comprising:
  a cylinder having a branch channel branched from the communication hole; and
  a plunger configured to reciprocate in the cylinder to suction the plasticized material or deliver the suctioned material to the channel, wherein
  a plurality of the measurement units are disposed in at least one of the screw, the barrel, and the cylinder.

3. The material discharge device according to claim 1, wherein
  the screw is a flat screw in which a length in a direction along the rotation shaft is smaller than a length in a direction perpendicular to the direction along the rotation shaft,
  the groove formation surface and the facing surface face each other in the direction along the rotation shaft,
  the flat screw includes a first portion having the groove formation surface, and a second portion that is separate from the first portion and that is coupled to a drive shaft of the drive motor, and
  the measurement unit is disposed between the first portion and the second portion.

4. The material discharge device according to claim 3, wherein
  when the first portion is made of a material containing iron as a main component, a thickness of the first portion is 0.2 mm or more and 10 mm or less, and
  when the first portion is made of a material containing aluminum as a main component, the thickness of the first portion is 0.2 mm or more and 14 mm or less.

5. The material discharge device according to claim 1, wherein
  the screw is a flat screw in which a length in a direction along the rotation shaft is smaller than a length in a direction perpendicular to the direction along the rotation shaft,
  the groove formation surface and the facing surface face each other in the direction along the rotation shaft,
  the barrel includes a third portion having the facing surface, and a fourth portion that is separate from the third portion and that does not have the facing surface, and the measurement unit is disposed between the third portion and the fourth portion.

6. The material discharge device according to claim 5, wherein
  when the third portion is made of a material containing iron as a main component, a thickness of the third portion is 0.2 mm or more and 15 mm or less, and
  when the third portion is made of a material containing aluminum as a main component, the thickness of the third portion is 0.2 mm or more and 21 mm or less.

7. The material discharge device according to claim 1, wherein
  the heating unit is disposed in the barrel, and
  the measurement unit is disposed at a position facing the facing surface of the heating unit.

8. The material discharge device according to claim 1, wherein
  the screw is a flat screw in which a length in a direction along the rotation shaft is smaller than a length in a direction perpendicular to the direction along the rotation shaft,
  the groove formation surface and the facing surface face each other in the direction along the rotation shaft,
  the heating unit is disposed in the barrel, and includes a first heating unit and a second heating unit that is disposed closer to the communication hole than is the first heating unit, and
  the first heating unit and the second heating unit are separately controlled, and a thickness of the second heating unit in the direction along the rotation shaft is larger than a thickness of the first heating unit.

9. The material discharge device according to claim 8, wherein
  the first heating unit and the second heating unit have a shape surrounding the communication hole as viewed from the direction along the rotation shaft.

10. The material discharge device according to claim 1, wherein
  the measurement unit is a pressure sensor including a piezoelectric body, the piezoelectric body including a piezoelectric element and an electrode.

11. The material discharge device according to claim 10, wherein
  the pressure sensor is formed by deposition in at least one of the nozzle, the screw, the barrel, and the cylinder.

12. A nozzle for injecting a plasticized material, the nozzle comprising:
  a nozzle channel wall that defines a channel through which the plasticized material flows, wherein
  a plurality of measurement units configured to measure a pressure or a temperature of the material at a plurality of locations in the channel are provided at an outer periphery of the nozzle channel wall, and
  a thickness of the nozzle channel wall satisfies following (1) or (2):
    (1) when the nozzle channel wall is made of a material containing iron as a main component, the thickness of the nozzle channel wall is 0.2 mm or more and 2.5 mm or less; and
    (2) when the nozzle channel wall is made of a material containing aluminum as a main component, the thickness of the nozzle channel wall is 0.2 mm or more and 4 mm or less.

* * * * *